(12) United States Patent
Harada et al.

(10) Patent No.: US 10,930,930 B2
(45) Date of Patent: Feb. 23, 2021

(54) ACTIVE MATERIAL, ELECTRODE, SECONDARY BATTERY, BATTERY PACK, AND VEHICLE

(71) Applicants: KABUSHIKI KAISHA TOSHIBA, Minato-ku (JP); Toshiba Infrastructure Systems & Solutions Corporation, Kawasaki (JP)

(72) Inventors: Yasuhiro Harada, Isehara (JP); Norio Takami, Yokohama (JP); Yasunobu Yamashita, Tokyo (JP); Kazuomi Yoshima, Yokohama (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 23 days.

(21) Appl. No.: 16/289,043

(22) Filed: Feb. 28, 2019

(65) Prior Publication Data
US 2020/0091513 A1    Mar. 19, 2020

(30) Foreign Application Priority Data

Sep. 14, 2018    (JP) .............................. JP2018-172323

(51) Int. Cl.
*H01M 4/485*    (2010.01)
*H01M 10/0525*    (2010.01)
(Continued)

(52) U.S. Cl.
CPC ............... *H01M 4/485* (2013.01); *B60L 7/10* (2013.01); *B60L 50/64* (2019.02);
(Continued)

(58) Field of Classification Search
CPC ......... H01M 10/0525; H01M 10/4257; H01M 2004/027; H01M 2010/4271;
(Continued)

(56) References Cited

U.S. PATENT DOCUMENTS

2011/0003788 A1    1/2011    Fujii et al.
2012/0115032 A1    5/2012    Harada et al.
(Continued)

FOREIGN PATENT DOCUMENTS

JP    2010-287496    12/2010
JP    2011-513199    4/2011
(Continued)

OTHER PUBLICATIONS

Madeleine Gasperin, "Affinement de la structure de $TiNb_2O_7$ et repartition des cations", Journal of Solid State Chemistry 53, 1984, 4 pages.

*Primary Examiner* — Victoria H Lynch
(74) *Attorney, Agent, or Firm* — Oblon, McClelland, Maier & Neustadt, L.L.P.

(57) ABSTRACT

According to one embodiment, an active material is provided. The active material includes a primary particle containing a phosphorus-containing monoclinic niobium-titanium composite oxide. The primary particle has a concentration gradient in which a phosphorus concentration increases from the gravity point of the primary particle toward the surface of the primary particle.

14 Claims, 8 Drawing Sheets

Figure 1:
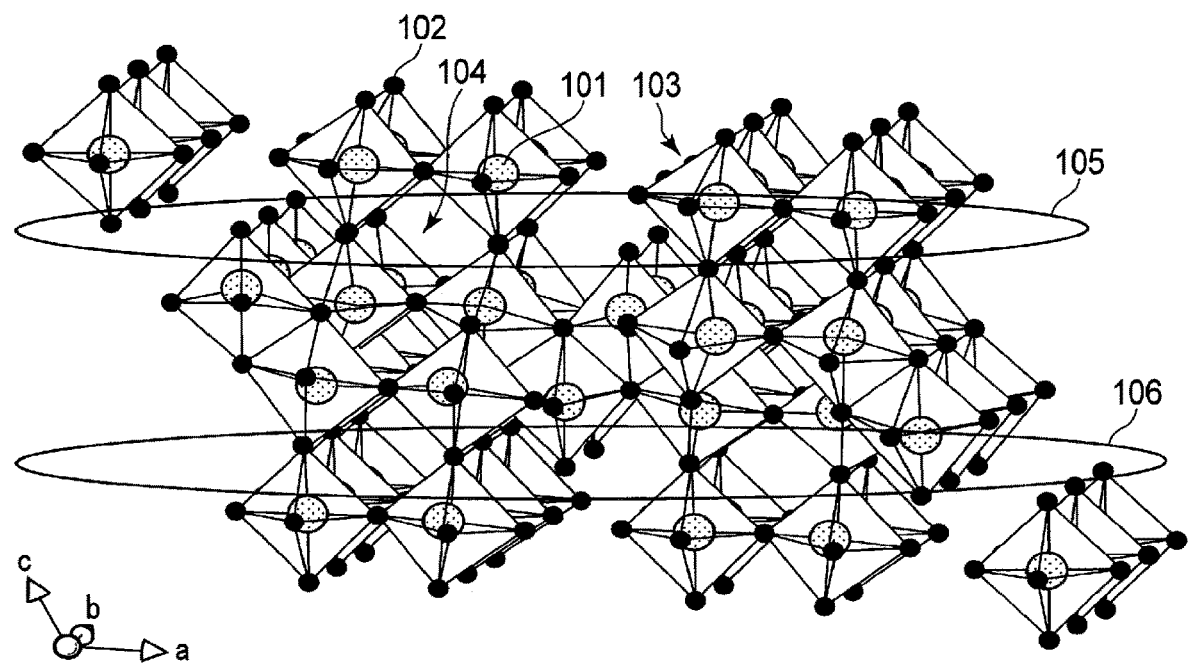

(51) Int. Cl.
*H01M 4/131* (2010.01)
*H01M 4/36* (2006.01)
*H01M 4/58* (2010.01)
*H01M 2/10* (2006.01)
*B60L 50/64* (2019.01)
*B60L 7/10* (2006.01)
*H01M 10/42* (2006.01)
*H01M 4/02* (2006.01)

(52) U.S. Cl.
CPC ......... *H01M 2/1077* (2013.01); *H01M 4/131* (2013.01); *H01M 4/366* (2013.01); *H01M 4/5825* (2013.01); *H01M 10/0525* (2013.01); *H01M 10/4257* (2013.01); *H01M 2004/027* (2013.01); *H01M 2010/4271* (2013.01); *H01M 2220/20* (2013.01)

(58) Field of Classification Search
CPC ........... H01M 2220/20; H01M 2/1077; H01M 4/131; H01M 4/366; H01M 4/485; H01M 4/5825

See application file for complete search history.

(56) References Cited

U.S. PATENT DOCUMENTS

| | | |
|---|---|---|
| 2017/0077504 A1 | 3/2017 | Ise et al. |
| 2017/0222272 A1 | 8/2017 | Takami et al. |
| 2017/0271667 A1 | 9/2017 | Yohshida et al. |

FOREIGN PATENT DOCUMENTS

| | | |
|---|---|---|
| JP | 5023239 B2 | 9/2012 |
| JP | 5925845 B2 | 5/2016 |
| JP | 2017-59397 | 3/2017 |
| JP | 2017-168352 | 9/2017 |
| JP | 2018-92955 | 6/2018 |

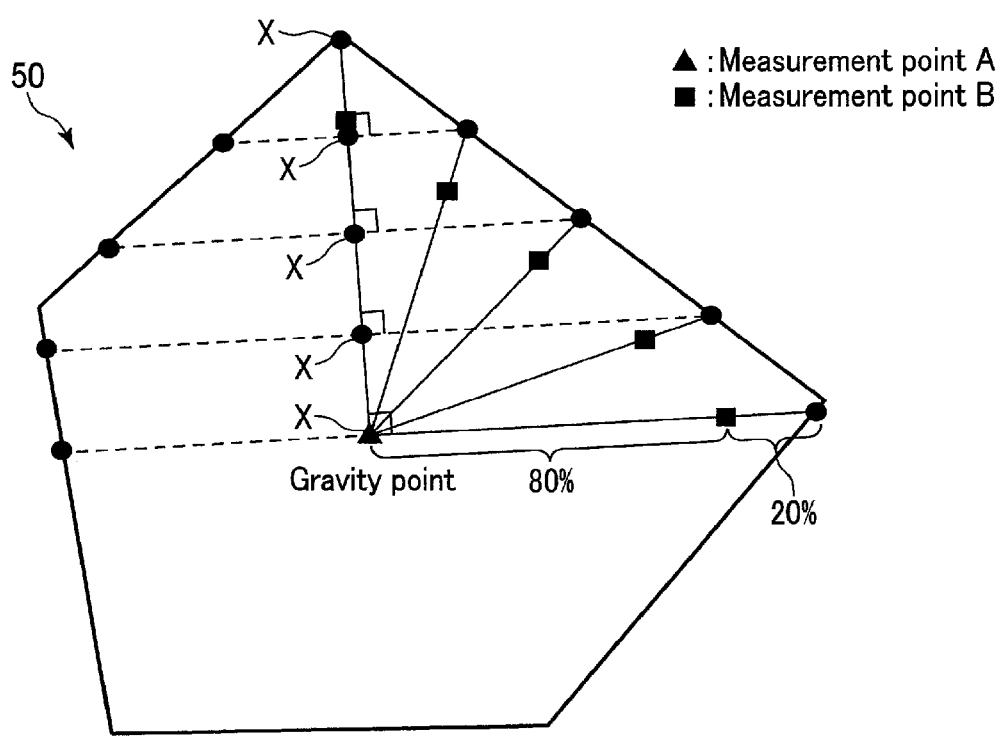
F I G. 3

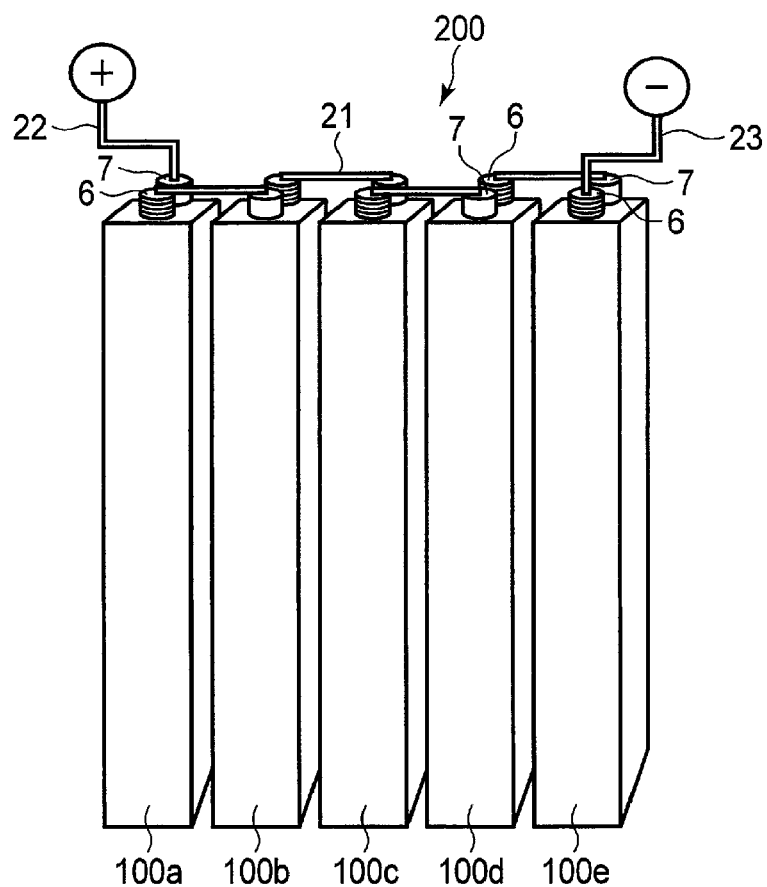
F I G. 8

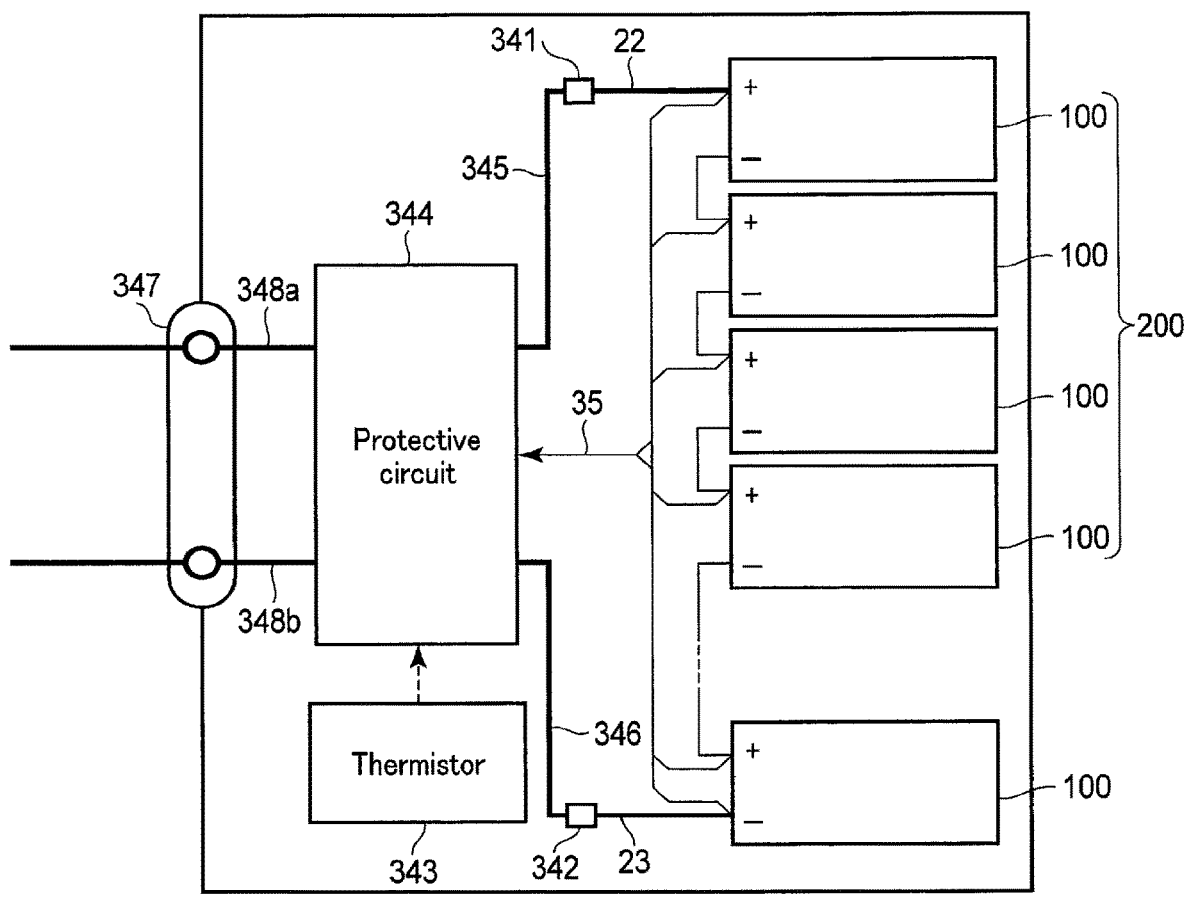
F I G. 10
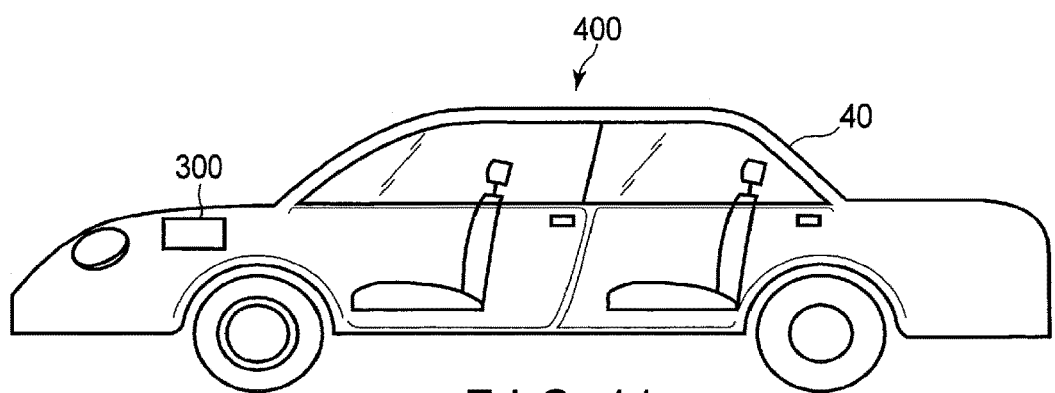
F I G. 11

ACTIVE MATERIAL, ELECTRODE, SECONDARY BATTERY, BATTERY PACK, AND VEHICLE

CROSS-REFERENCE TO RELATED APPLICATIONS

This application is based upon and claims the benefit of priority from Japanese Patent Application No. 2018-172323, filed Sep. 14, 2018, the entire contents of which are incorporated herein by reference.

FIELD

Embodiments described herein relate generally to an active material, an electrode, a secondary battery, a battery pack, and a vehicle.

BACKGROUND

Recently, secondary batteries, such as a nonaqueous electrolyte secondary battery like a lithium ion secondary battery, have been actively researched and developed as a high energy-density battery. The secondary batteries, such as a nonaqueous electrolyte secondary battery, are anticipated as a power source for vehicles such as hybrid electric automobiles, electric cars, an uninterruptible power supply for base stations for portable telephones, or the like. Therefore, the secondary battery is demanded to, in addition to having a high energy density, be excellent in other performances such as rapid charge-discharge performances and long-term reliability, as well. For example, not only is the charging time remarkably shortened in a secondary battery capable of rapid charge and discharge, but the battery is also capable of improving motive performances in vehicles such as hybrid electric automobiles, and efficient recovery of regenerative energy of motive force.

In order to enable rapid charge/discharge, electrons and lithium ions must be able to migrate rapidly between the positive electrode and the negative electrode. However, when a battery using a carbon-based negative electrode is repeatedly subjected to rapid charge and discharge, precipitation of dendrite of metallic lithium on the electrode may sometimes occur, raising concern of heat generation or ignition due to internal short circuits.

In light of this, a battery using a metal composite oxide in a negative electrode in place of a carbonaceous material has been developed. In particular, in a battery using an oxide of titanium in the negative electrode, rapid charge and discharge can be stably performed. Such a battery also has a longer life than in the case of using a carbon-based negative electrode.

However, compared to carbonaceous materials, oxides of titanium have a higher potential relative to metallic lithium. That is, oxides of titanium are more noble. Furthermore, oxides of titanium have a lower capacity per weight. Therefore, a battery using an oxide of titanium for the negative electrode has a problem that the energy density is low.

For example, the electrode potential an oxide of titanium is about 1.5 V (vs. $Li/Li^+$) relative to metallic lithium, which is higher (i.e., more noble) in comparison to potentials of carbon based negative electrodes. The potential of an oxide of titanium is attributed to the redox reaction between $Ti^{3+}$ and $Ti^{4+}$ upon electrochemical insertion and extraction of lithium, and is therefore electrochemically restricted. It is also a fact that rapid charge/discharge of lithium ions can be performed stably at a high electrode potential of about 1.5 V (vs. $Li/Li^+$). Conventionally, it has therefore been difficult to drop the potential of the electrode in order to improve the energy density.

On the other hand, considering the capacity per unit weight, the theoretical capacity of titanium dioxide (anatase structure) is about 165 mAh/g, and the theoretical capacity of spinel type lithium-titanium composite oxides such as $Li_4Ti_5O_{12}$ is about 180 mAh/g. On the other hand, the theoretical capacity of a general graphite based electrode material is 385 mAh/g and greater. As such, the capacity density of an oxide of titanium is significantly lower than that of the carbon based negative electrode material. This is due to there being only a small number of lithium-insertion sites in the crystal structure, and lithium tending to be stabilized in the structure, and thus, substantial capacity being reduced.

In consideration of the above circumstances, a new electrode material containing Ti and Nb has been studied. Such a niobium-titanium composite oxide material is expected to have a high charge/discharge capacity. Particularly, a composite oxide represented by $TiNb_2O_7$ has a high theoretical capacity exceeding 380 mAh/g. Therefore, a niobium-titanium composite oxide is expected as a high-capacity material to replace $Li_4Ti_5O_{12}$, but there is a problem that a lattice volume fluctuates during a charge-and-discharge cycle and the contact between particles gets worse to cause deterioration in electronic conduction network in the electrode.

BRIEF DESCRIPTION OF THE DRAWINGS

FIG. 1 is a schematic view illustrating a crystal structure of a niobium-titanium composite oxide $Nb_2TiO_7$;

FIG. 2 is a schematic view illustrating the crystal structure of FIG. 1 from another direction;

FIG. 3 is a plan view schematically illustrating particles to be measured in a transmission electron microscope (TEM) observation;

FIG. 4 is a cross-sectional view schematically illustrating an example of a secondary battery according to an embodiment;

FIG. 5 is an enlarged cross-sectional view of a section A of the secondary battery illustrated in FIG. 4;

FIG. 6 is a partially cut-out perspective view schematically illustrating another example of the secondary battery according to the embodiment;

FIG. 7 is an enlarged cross-sectional view of a section B of the secondary battery illustrated in FIG. 6;

FIG. 8 is a perspective view schematically illustrating an example of a battery module according to an embodiment;

FIG. 9 is an exploded perspective view schematically illustrating an example of a battery pack according to an embodiment;

FIG. 10 is a block diagram illustrating an example of an electric circuit of the battery pack illustrated in FIG. 9;

FIG. 11 is a cross-sectional view schematically illustrating an example of a vehicle according to an embodiment;

FIG. 12 is a diagram schematically illustrating another example of the vehicle according to the embodiment.

DETAILED DESCRIPTION

According to a first embodiment, an active material is provided. The active material includes a primary particle containing a phosphorus-containing monoclinic niobium-titanium composite oxide. The primary particle has a concentration gradient in which a phosphorus concentration increases from the gravity point of the primary particle toward the surface of the primary particle.

According to a second embodiment, an electrode is provided. The electrode includes the active material according to the first embodiment.

According to a third embodiment, a secondary battery is provided. The secondary battery includes the electrode according to the second embodiment.

According to a fourth embodiment, a battery module is provided. The battery module includes a plurality of the secondary batteries according to the third embodiment.

According to a fifth embodiment, a battery pack is provided. The battery pack includes the secondary battery according to the third embodiment or the battery module according to the fourth embodiment.

According to a sixth embodiment, a vehicle is provided. The vehicle includes the battery pack according to the fifth embodiment.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, an active material is provided. This active material includes a primary particle containing a phosphorus-containing monoclinic niobium-titanium composite oxide. The primary particle has a concentration gradient in which a phosphorus concentration increases from the gravity point of the primary particle toward the surface of the primary particle.

Hereinafter, the reason why the active material according to the embodiment can realize a secondary battery capable of achieving excellent rate characteristics will be described.

First, as an example of monoclinic niobium-titanium composite oxide, $Nb_2TiO_7$ phase will be described.

The main phase contained in the active material according to the embodiment is a niobium-titanium composite oxide phase represented by $Nb_2TiO_7$ as a representative composition. A composition of the niobium-titanium composite oxide preferably has a crystal structure having a symmetry of the space group C2/m and an atomic coordination described in "M. Gasperin, Journal of Solid-State Chemistry 53, pp. 144-147 (1984)" although not limited thereto.

Figure 2:
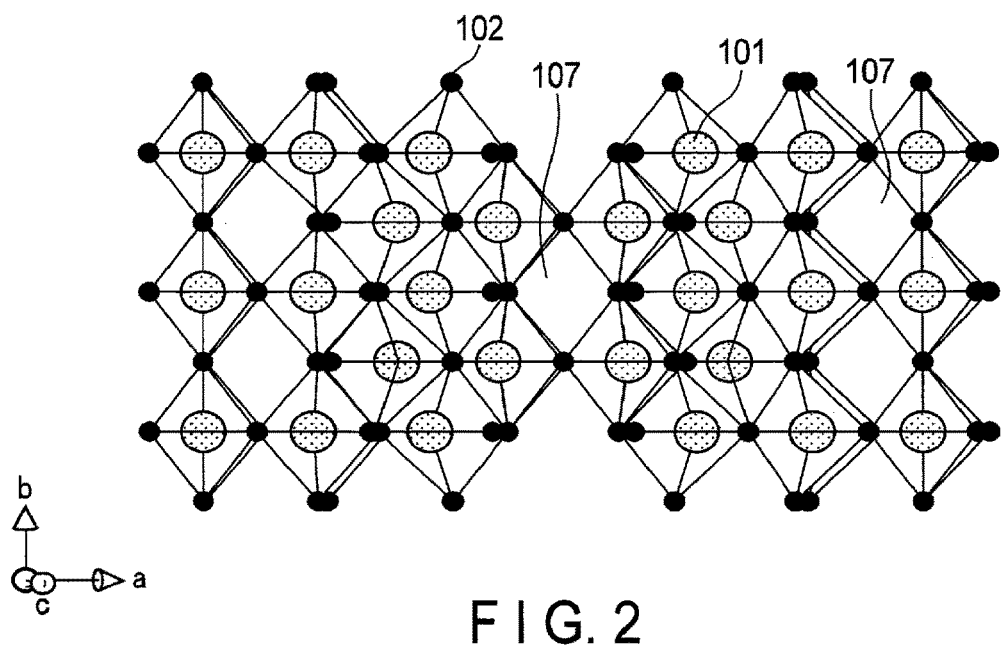

Schematic views of the crystal structure of monoclinic $Nb_2TiO_7$ are illustrated in FIGS. 1 and 2.

As illustrated in FIG. 1, in the crystal structure of monoclinic $Nb_2TiO_7$, a metal ion 101 and an oxide ion 102 form a skeleton structure section 103. At a position of the metal ion 101, Nb ions and Ti ions are arbitrarily arranged at a ratio of Nb:Ti=2:1. Such skeleton structures 103 are alternately arranged three-dimensionally, thereby vacancies 104 are formed among the skeleton structures 103. These vacancies 104 serve as hosts for lithium ions. Lithium ions can be inserted in this crystal structure from 0 moles up to a maximum of 5.0 moles. Therefore, the composition when 0 to 5.0 moles of lithium ions are inserted can be expressed as $Li_xNb_2TiO_7$ (0≤x≤5).

In FIG. 1, regions 105 and 106 are sections having two-dimensional channels in [100] and [010] directions. As illustrated in FIG. 2, the crystal structure of monoclinic $Nb_2TiO_7$ has a vacancy 107 along a [001] direction. This vacancy 107 has a tunnel structure advantageous in conduction of lithium ions and serves as an electrically conductive path in a [001] direction connecting region 105 and region 106. This electrically conductive path makes it possible for the lithium ions to migrate between regions 105 and 106. Further, the niobium-titanium composite oxide has a lithium insertion potential of about 1.5 V (vs. Li/Li$^+$). Therefore, an electrode including the niobium-titanium composite oxide as the active material can realize a battery that can stably repeat rapid charging and discharging.

When a lithium ion is inserted into the vacancy 104 in the above crystal structure, the metal ion 101, which forms the skeleton, is reduced to a trivalent, thereby maintaining electric neutrality of a crystal. In the niobium-titanium composite oxide, not only a Ti ion is reduced from tetravalent to trivalent, but also a Nb ion is reduced from pentavalent to trivalent. Therefore, the number of reduced valences per active material weight is large. Therefore, it is possible to maintain electric neutrality of the crystal even when many lithium ions are inserted. Thus, energy density is high as compared with that of a compound such as titanium oxide containing only a tetravalent cation.

The active material according to the embodiment includes primary particles containing a phosphorus-containing monoclinic niobium-titanium composite oxide. When the phosphorus concentration gradually increases from the gravity point of the primary particle toward the surface of the primary particle, it is possible to improve a diffusion rate of lithium ions into the primary particle while ensuring a practical battery capacity. The reason for this will be described.

A phosphorus atom shows strong covalent bonding with an oxide ion in an oxide. When lithium ions diffuse in a niobium titanium oxide, the electron correlation between Li and O may be a barrier, but due to the strong covalent bonding between the phosphorus atom and the oxide ion, the electron correlation between Li and O tends to weaken. As a result, the diffusion rate of lithium ions is improved.

On the other hand, when the niobium-titanium composite oxide contains a phosphorus atom, the amount of Nb that can be reduced at the time of charge and discharge decreases, which leads to a decrease in charge/discharge capacity. Therefore, by generating a concentration gradient in the primary particles, the diffusion rate of lithium ions can be improved in a portion where the phosphorus concentration is high, and a practical charge/discharge capacity can be achieved in a portion where the phosphorus concentration is low (near the gravity point of the particles).

When lithium ions diffuse in the primary particle, the diffusion distance from the vicinity of the particle surface to the inside of the particle (near the particle center) is long and the activation energy for diffusion is high. Therefore, it is possible to efficiently diffuse lithium ions throughout the primary particle by increasing the phosphorus concentration in the vicinity of the particle surface and facilitating the diffusion of lithium ions from the vicinity of the particle surface toward the inside of the particle. Furthermore, since the phosphorus concentration in the interior of the particle is low, more lithium ions can be inserted, so that a high charge/discharge capacity can be achieved.

Regarding the concentration gradient of phosphorus, the ratio (C2/C1) is preferably in the range of 1.05 to 100. Here, C1 is the phosphorus concentration at the position of the gravity point of the primary particle, C2 is the phosphorus concentration at the position corresponding to 80% of the length defined from the gravity point to the surface of the primary particle concentration. The ratio (C2/C1) is more preferably in the range of 1.05 to 10.0.

The concentrations C1 and C2 can be confirmed by transmission electron microscope (TEM) observation with energy dispersive X-ray spectrometry (EDX) function. According to the TEM-EDX observation, the distribution of each crystal in a material having a mixed phase (active material) can be confirmed, and the distribution of each element can be visualized and the element concentration can be obtained. A specific method of TEM-EDX observation will be described later.

The concentration C1 is, for example, in the range of 0.01 atm % to 6 atm %, preferably in the range of 0.1 atm % to 1.0 atm %. The concentration C2 is, for example, in the range of 0.0105 atm % to 15 atm %, preferably in the range of 0.0105 atm % to 5.5 atm %.

Phosphorus present in the primary particle can be present in, for example, a state in which phosphorus has been substituted at the site of Nb ion in the crystal structure of the monoclinic niobium-titanium composite oxide, and a state in which phosphorus is precipitated at the crystal grain boundary. Alternatively, a phosphate compound may be present at least a part of the surface of the primary particle.

In the case where phosphorus has been substituted for the site of Nb ion, as described above, the covalent bonding between the phosphorus atom and the oxide ion is high, so that the diffusion rate of lithium ions can be improved. Phosphorus present at the crystal grain boundary of the primary particle can be present in the form of phosphorus oxide and/or phosphate compound. When the phosphorus oxide and/or phosphate compound is present in the crystal grain boundary, the binding between the particles becomes stronger and even when a crystal lattice volume varies during a charge-and-discharge cycle, particles are hardly separated, so that a favorable electrically conductive path can be formed.

It is preferable that a phosphate compound is present at least a part of the surface of the primary particle because, as will be described later, the binding property between the primary particles at the time of formation of secondary particles can be enhanced to form a favorable electrically conductive path. In addition, when the phosphate compound is present on the surface of the primary particle, the active material does not come into direct contact with the electrolyte, and there is thus an advantage that decomposition reaction (side reaction) of the electrolyte during charge and discharge hardly occurs.

The type of the phosphate compound present at the crystal grain boundary of the primary particle and the surface of the primary particle is not particularly limited, but examples thereof include phosphate such as lithium phosphate, potassium phosphate, sodium phosphate, magnesium phosphate, titanium phosphate, zirconium phosphate, manganese phosphate, iron phosphate, aluminum phosphate, tantalum phosphate, tungsten phosphate, niobium phosphate, molybdenum phosphate, and bismuth phosphate.

It is preferable that the phosphate compound present at least a part of the surface of the primary particle be at least one selected from the group consisting of phosphorus oxide, iron phosphate, and potassium phosphate. The phosphate compound present at least a part of the surface of the primary particle may be at least one selected from the group consisting of iron phosphate and potassium phosphate.

When phosphorus oxide is present on the surface of the primary particles, a dehydrating effect of reacting a trace amount of moisture contained in the nonaqueous electrolyte with phosphorus oxide is obtained. As a result, it is possible to suppress the amount of hydrogen produced during charge and discharge and suppress the swelling of the battery in a long-term charge-and-discharge cycle.

When iron phosphate is present on the surface of primary particles, electron conductivity of the particle surface can be enhanced. This is because the iron ion is reduced at the time of charge and discharge and the electron conductivity is exhibited.

When potassium phosphate is present on the surface of primary particles, affinity between the primary particle and the lithium ion can be enhanced. This is because potassium is the same alkali metal element as lithium.

The phosphorus-containing monoclinic niobium-titanium composite oxide according to the embodiment has, for example, an average composition represented by the general formula $Ti_{1-x}M1_xNb_{2-y-z}M2_yP_zO_7$. In the above general formula, $0 \le x < 1$, $0 \le y < 1$, and $0 < z \le 0.5$. each of the elements M1 and M2 is at least one selected from the group consisting of V, Ta, Fe, Bi, Cr, Mo, W, B, K, Na, Mg, Al, and Si. The element M1 and the element M2 may be the same element or different elements from each other.

As the element M1, it is preferable to use at least one element of Cr, Fe, and Al. These elements are trivalent elements. Therefore, when these elements are used as the element M1, the electron conductivity of the monoclinic niobium-titanium composite oxide can be improved. Therefore, when these elements are used as the element M1, the capacity and rapid charge/discharge performance of the battery can be improved.

From the viewpoint of improving electron conductivity, it is more preferable to use at least one element selected from the group consisting of V, Ta, and Bi as the element M1. Since these elements are pentavalent elements, the electron conductivity of the monoclinic niobium-titanium composite oxide can be further improved.

As the element M1, it is preferable to use at least one element selected from the group consisting of B, K, Na, Mg, and Si. Atomic weights of these elements are each smaller than an atomic weight of Ti. Therefore, when these elements are used as the element M1, the capacity of the battery can be increased.

As the element M2, it is preferable to use at least one element selected from the group consisting of Mo and W. Since these elements are hexavalent elements, the electron conductivity of the monoclinic niobium-titanium composite oxide can be improved.

When Ta is used as the element M2, it is possible to obtain a monoclinic niobium-titanium composite oxide having an equivalent performance to that in the case of using Nb as the element M2. This is considered to be because Nb and Ta have similar physical, chemical and electrical properties.

As the elements M1 and M2, at least one element selected from the group consisting of Mo, W, and V may be used. These elements exhibit an effect as a sintering aid. Therefore, when these elements are used as at least one of M1 and M2, a firing temperature at the time of manufacturing the monoclinic niobium-titanium composite oxide can be lowered.

A content of each of the elements M1 and M2 in the compound represented by the general formula $Ti_{1-x}M1_xNb_{2-y-z}M2_yP_zO_7$ can be quantified by, for example, inductively coupled plasma (ICP) spectroscopic analysis.

Note that the active material according to the first embodiment may contain an oxide having a composition deviating from a stoichiometric ratio represented by the general formula $Ti_{1-x}M1_xNb_{2-y-z}M2_yP_zO_7$. Such an oxide can be represented by the general formula $Ti_{1-x}M1_xNb_{2-y-z}M2_yP_zO_{7+\delta}$ ($0 \leq x < 1$, $0 \leq y < 1$, $0 < z \leq 0.5$, $-0.3 \leq \delta \leq 0.3$).

That is, during preparation of the phosphorus-containing monoclinic niobium-titanium composite oxide, oxygen deficiency may occur in a raw material or an intermediate product. In addition, inevitable impurities contained in the raw material and impurities mixed in the preparation may be present in the composite oxide in some cases. Due to such unavoidable factors, a phosphorus-containing monoclinic niobium-titanium composite oxide containing an oxide having a composition of the stoichiometric ratio may be prepared in some cases. The oxide having a composition deviating from the stoichiometric ratio as above is excellent in lithium-ion insertion stability as is that of an oxide having a composition of the stoichiometric ratio. Therefore, even when the phosphorus-containing monoclinic niobium-titanium composite oxide contains the oxide having a composition deviating from such a stoichiometric ratio, the influence on the lithium-ion insertion capacity is small.

In addition, the primary particles according to the embodiment may contain a monoclinic niobium-titanium composite oxide phase not containing phosphorus. The monoclinic niobium-titanium composite oxide phase not containing phosphorus is represented by, for example, a general formula $Ti_{1-x}M3_xNb_{2-y}M4_yO_7$. In the above general formula, $0 \leq x < 1$, $0 \leq y < 1$, each of the elements M3 and M4 is at least one selected from the group consisting of V, Ta, Fe, Bi, Cr, Mo, W, B, K, Na, Mg, Al, and Si, and the elements M3 and M4 may be the same element or different elements from each other. The primary particles according to the embodiment may contain a heterogeneous phase different in Nb/Ti ratio from this general formula. Examples of such different phases are rutile type $TiO_2$, $Nb_{24}TiO_{62}$, $Nb_{14}TiO_{37}$, and $Nb_{10}Ti_2O_{29}$.

The lattice volume of the niobium-titanium composite oxide fluctuates due to charge and discharge. Therefore, when the niobium-titanium composite oxide is present as primary particles in the electrode, the state of contact between a binder and a conductive agent constituting the active material-containing layer and the active material particle tends to change. Therefore, peeling of the active material-containing layer from the current collector and peeling of the active material particle from the conductive agent occur during repeated charge and discharge, so that the electrically conductive path in the electrode is easily shredded.

Therefore, the active material according to the embodiment preferably contains the secondary particles formed by granulation of a plurality of primary particles via the phosphate compound. In other words, a phosphate compound is present between a plurality of primary particles contained in such a secondary particle. This makes it possible to suppress shredding of the electrically conductive path due to a change in lattice volume during charge and discharge. The phosphate compound not only tightly binds the primary particles to each other but also makes it easy for the lithium ions to move. Therefore, the secondary particle formed by binding the plurality of primary particles with the phosphate compound can not only make the electrically conductive path resistant to shredding, but also make the movement of the lithium ions smooth by the phosphate compound interposed between the particles. That is, the lithium ion can rapidly move between the primary particles. Therefore, when the active material according to the embodiment contains the secondary particle formed of a plurality of primary particles, and the phosphate compound is present between the plurality of primary particles, it is possible to realize the secondary battery having excellent rate characteristics and to suppress deterioration in the electrode when charge and discharge are repeated. That is, in this case, a secondary battery having excellent life characteristics can be realized. It is more preferable that the phosphate compound present between the plurality of primary particles contain at least one selected from the group consisting of iron phosphate and potassium phosphate, because the lithium ion conductivity between the particles can be enhanced.

Next, the form, particle diameter and specific surface area of the active material according to the embodiment will be described.

<Form>

The form of the active material according to the embodiment is, for example, the form of the secondary particles in which the surfaces of the primary particles is the phosphate compound, and the secondary particles is formed by binding the primary particles via the phosphate compound, but the active material does not need to be formed of only the secondary particles. The active material may be a mixture of the primary particles and the secondary particles.

A particle of the niobium-titanium composite oxide may have a carbon-containing layer on each of the primary particle surface and the secondary particle surface. The active material may contain a secondary particle granulated by the carbon-containing layer adhering to the primary particle, on the surface of which the phosphate compound is present. Such secondary particle can exhibit excellent conductivity because carbon is present between the primary particles. In such an embodiment containing the secondary particles, the secondary particles tightly bonded via the phosphate compound and the secondary particles bonded via the carbon-containing layer are mixed, whereby it is possible to enhance the life performance and show lower resistance.

The ratio of the weight of the niobium-titanium composite oxide present in the form of the secondary particles with respect to the weight of the active material is, for example, in the range of 5.0% by weight to 99.0% by weight.

<Particle Size>

An average particle size of the active material particles, which are the primary particles or the secondary particles of the niobium-titanium composite oxide, is not particularly limited. An average particle size of the active material particle is, for example, in the range of 0.1 µm to 50 µm. The average particle size can be varied in accordance with required battery characteristics. For example, it is preferable to set the average particle size to 1.0 µm or less in order to enhance rapid charge/discharge performance. In this manner, it is possible to reduce a diffusion distance between lithium ions in the crystal, so that the rapid charge/discharge performance can be enhanced. The average particle size can be obtained by laser diffraction, for example.

<BET Specific Surface Area>

The BET (Brunauer, Emmett, Teller) specific surface area of the active material according to the embodiment is not particularly limited. However, the BET specific surface area is preferably 5 $m^2/g$ or more and less than 200 $m^2/g$.

If the specific surface area is 5 $m^2/g$ or more, a contact area with the electrolyte can be secured, favorable discharge rate characteristics can be easily obtained, and the charging time can be shortened. If the specific surface area is less than 200 $m^2/g$, on the other hand, reactivity with the electrolyte does not become too high so that the life performance can be improved. Further, coating properties of a slurry used in the production of an electrode described below and including the active material can be made favorable.

Here, for the measurement of the specific surface area, a method is used by which molecules, in which an occupied area in adsorption is known, are adsorbed onto the surface of powder particles at a temperature of liquid nitrogen and the specific surface area of the sample is determined from the amount of adsorbed molecules. The most commonly used is the BET method based on low-temperature and low-humidity physical adsorption of an inert gas, which is the most famous theory as a method of calculating the specific surface area by extending the Langmuir theory, which is monomolecular layer adsorption theory to multi-molecular layer adsorption. The specific surface area determined by the above method is referred to as a "BET specific surface area".

<TEM-EDX Observation>

Next, a method of observing a transmission electron microscope (TEM-EDX) with an energy dispersive X-ray spectroscopic function will be described. As described above, according to the TEM-EDX observation, a distribution of each crystal in a material having a mixed phase (active material) can be confirmed. It is also possible to visualize the distribution of the element and to determine a concentration of the element.

In the case of conducting TEM-EDX observation on the active material contained in the electrode, for example, the observation can be performed as follows.

First, in order to grasp the crystal state of the active material, lithium ions are fully released from the active material. For example, when the active material is used in the negative electrode, the battery is brought into a fully discharged state. The battery can be brought into the discharged state by, for example, repeating the discharge of the battery at 0.1 C current at 25° C. until a rated end voltage or a battery voltage reaches 1.0 V a plurality of times, so that the current value at the time of discharge becomes $1/100$ or less of the rated capacity. There may be lithium ions remaining even in the discharged state.

Next, the battery is dissembled in a glove box filled with argon, and the electrode is taken out and washed with an appropriate solvent. As an appropriate solvent, for example, ethyl methyl carbonate can be used. When the cleaning of the electrode is insufficient, an impurity phase such as lithium carbonate and lithium fluoride may be mixed due to the influence of lithium ions remaining in the electrode. In that case, an airtight container capable of performing measurement atmosphere in an inert gas may be used. At this time, peaks derived from metal foil which is the current collector, the conductive agent, the binder, and the like are measured in advance by using EDX and grasped. Naturally, when you have been able to grasp these in advance, this operation can be omitted. When the peak of the current collector and the peak of the active material overlap, it is desirable to perform measurement by peeling the active material-containing layer off the current collector. This is for separating the overlapping peaks at the time of quantitatively measuring peak intensity. The active material-containing layer may be physically peeled. The active material-containing layer tends to be peeled when an ultrasonic wave is applied to the active material-containing layer in an appropriate solvent. When ultrasonic treatment is performed to peel the active material-containing layer off the current collector, an electrode body powder (including the active material, the conductive agent, and the binder) can be recovered by volatilizing the solvent.

In the TEM-EDX measurement, it is desirable to embed a target sample powder in resin or the like and observe the particle cross section by scraping the inside of a specimen by mechanical polishing and ion milling. In addition, similar treatment can be performed even when the target sample is an electrode body. It is also possible to embed the electrode body in the state of being the electrode body as it is and observe a desired portion, or it is also possible to separate the current collector (metal foil) from the electrode body and observe the electrode powder mixed with the conductive agent and the binder. In this manner, it is possible to see how the niobium-titanium composite oxide, the phosphorus oxide and/or phosphate compound are distributed in the primary particle, and it is further possible to see the composition in the particle. For example, when the surface of the primary particle is a phosphate compound, it is also possible to observe a boundary portion between the phosphate compound and the niobium-titanium composite oxide phase present inside the phosphate compound. In addition, by observing the contact portion between the primary particles at a relatively low magnification, it can be confirmed whether or not the secondary particle is contained in the powder to be measured.

A specific example will be described with reference to FIG. 3. FIG. 3 is a plan view schematically showing a cross section of an object to be measured. First, the gravity point of a primary particle 50 to be measured is regarded as the center of the particle (measurement point A). Next, five points X are set at equal intervals on a straight line connecting the particle gravity point and an arbitrary point on the particle surface. In a region orthogonal to each point X, a point corresponding to 80% of the distance from the gravity point toward an outer shell (surface) to the particle surface is regarded as a measurement point B. For each measurement point B, an electron beam diffraction pattern is observed. At this time, by examining a multi-wave interference image, phosphorus oxide or phosphate compound can be searched separately from the monoclinic niobium-titanium composite oxide phase separately. For example, by simulating the electron beam diffraction pattern in advance, it is possible to easily distinguish the monoclinic niobium-titanium composite oxide phase, phosphorus oxide, the phosphate compound and other phases. Next, an amount of phosphorus in the particle cross section is mapped using the EDX. Then, a concentration (atm %) at the central portion (measurement point A) of the particle and a concentration (atm %) at the measurement point B at each of the five places are measured. For the measurement point B, an average value of the concentrations at the five places is calculated. This measurement is performed on ten randomly selected particles.

A concentration C1 is an average concentration (atm %) obtained by averaging the phosphorus concentrations at the measurement point A, measured for the ten randomly selected particles. A concentration C2 is an average concentration (atm %) obtained by further averaging the average values of phosphorus concentrations at five measurement points B, measured the for ten randomly selected particles. When the concentration C2 is higher than the concentration C1, the active material particles to be measured can be regarded as having a concentration gradient continuously increasing from the gravity point toward the surface.

The crystal structure of the phosphate compound contained in the active material and the niobium-titanium composite oxide of the primary particle portion (core particle portion) can be confirmed by powder X-ray diffraction measurement and transmission electron microscope (TEM) observation, for example.

<Measurement of Powder X-Ray Diffraction of Active Material>

The powder X-ray diffraction measurement of the active material can be performed, for example, as follows.

First, the target sample is ground until an average particle size reaches about 5 µm. A holder part, which has a depth of 0.2 mm and is formed on a glass sample plate, is filled with the ground sample. At this time, care should be taken to fill the holder part sufficiently with the sample. In addition, Precaution should be taken to perform the filling with the amount of the sample neither being excessive nor insufficient such that cracks, voids, and the like do not occur. Next, another glass plate is pushed from the outside to flatten a surface of the sample filling the holder part. Precaution should be taken not to cause a recess or a protrusion from a reference plane of the holder due to an excessive or insufficient amount of filling.

Next, the glass plate filled with the sample is set in a powder X-ray diffractometer, and a diffraction pattern (X-Ray diffraction pattern (XRD pattern)) is obtained using Cu-Kα rays.

Incidentally, there is a case where the orientation of the sample increases depending on a particle shape of the sample. In the case where there is high degree of orientation in the sample, there is the possibility of deviation of the peak or variation in an intensity ratio, depending on the filling state of the sample. The sample whose orientation is remarkably high in this manner is measured using a glass capillary. Specifically, a sample is inserted into a capillary, and this capillary is placed on a rotary sample stage and measured. It is possible to alleviate the orientation with the above-described measuring method. It is preferable to use a capillary formed of Lindeman glass having a diameter of 1 mm to 6 mmφ as the glass capillary.

When the powder X-ray diffraction measurement is performed on the active material contained in the electrode, the measurement is performed, for example, as follows.

First, in order to grasp the crystal state of the active material, lithium ions are fully released from the active material. As this operation, for example, the battery can be brought into the discharged state by the method described in the section of the TEM-EDX observation.

Next, the battery is dissembled in a glove box filled with argon, and the electrode is taken out and washed with an appropriate solvent. As an appropriate solvent, for example, ethyl methyl carbonate can be used. When the cleaning of the electrode is insufficient, an impurity phase such as lithium carbonate and lithium fluoride may be mixed due to the influence of lithium ions remaining in the electrode. In that case, an airtight container capable of performing measurement atmosphere in an inert gas may be used. The washed electrode is cut so as to have an area approximately equal to an area of the holder of the powder X-ray diffraction apparatus, to obtain a measurement sample. The sample is directly attached to a glass holder for measurement.

At this time, peaks derived from metal foil which is the current collector, the conductive agent, the binder, and the like are measured in advance by using XRD and grasped. Naturally, when you have been able to grasp these in advance, this operation can be omitted. When the peak of the current collector and the peak of the active material overlap, it is desirable to perform measurement by peeling the active material-containing layer off the current collector. This is for separating the overlapping peaks at the time of quantitatively measuring peak intensity. The active material-containing layer may be physically peeled. The active material-containing layer tends to be peeled when an ultrasonic wave is applied to the active material-containing layer in an appropriate solvent. When ultrasonic treatment is performed to peel the active material-containing layer off the current collector, an electrode body powder (including the active material, the conductive agent, and the binder) can be recovered by volatilizing the solvent. Powder X-ray diffraction measurement of the active material can be performed by filling, for example, a Lindemann glass capillary or the like with the collected electrode body powder and measuring the electrode body powder. Note that the electrode body powder recovered by the ultrasonic treatment can also be subjected to various analyses other than the powder X-ray diffraction measurement.

In the obtained diffraction peak, a mixed chart of a peak attributed to the niobium-titanium composite oxide phase having the maximum peak intensity and a peak attributed to the phosphate compound is observed.

<ICP Emission Spectroscopy>

The composition of the active material can be analyzed using, for example, inductively coupled plasma (ICP) emission spectroscopy. At this time, an abundance ratio (molar ratio) of each element depends on sensitivity of an analyzer to be used. Hence the measured molar ratio may deviate from an actual molar ratio by an error of the measuring device. However, even when the numerical value deviates from the error range of the analyzer, the performance of the active material according to the embodiment can be exhibited sufficiently.

For measuring the composition of the active material incorporated in the battery by the ICP emission spectroscopy, specifically, the following procedure is performed.

First, the electrode containing the active material to be measured is taken out from the secondary battery by the procedure described in the section of the powder X-ray diffraction measurement, and then washed. From the washed electrode, the portion containing the electrode active material such as the active material-containing layer is peeled. The portion containing the electrode active material can be peeled by, for example, irradiating the portion with ultrasonic waves. As a specific example, for example, by placing the electrode in ethyl methyl carbonate placed in a glass beaker and vibrating the electrode in an ultrasonic washer, it is possible to peel the active material-containing layer containing the electrode active material off the electrode current collector.

Next, the peeled portion is heated in an atmosphere for a short time (e.g., at 500° C. for about 1 hour) to burn off unnecessary components such as the binder component and carbon. By dissolving this residue with acid, a liquid sample containing an active material can be prepared. At this time, hydrochloric acid, nitric acid, sulfuric acid, hydrogen fluoride, and the like can be used as the acid. The composition in the active material can be seen by subjecting this liquid sample to ICP analysis.

<Manufacturing Method>

The active material according to the embodiment can be produced by a first synthesis method described below.

(First Synthesis Method)

First, in addition to various salts such as niobium oxide, titanium oxide, and oxides or carbonates of additional elements (M1 and M2 below), $P_2O_5$ as a phosphorus source is prepared. At this time, for example, the phosphorus source is added so that phosphorus is in excess of 10 mol % to 500 mol %, more than a molar amount represented by the general formula $Ti_{1-x}M1_xNb_{2-y-z}M2_yP_zO_7$, which is a target composition. Next, after heating at 350° C. for 2 hours, firing is performed at 800° C. for 12 hours and at 1000° C. for 2 hours.

Thereafter, by rapidly quenching to room temperature or lower, the phosphorus-containing niobium-titanium composite oxide particle having a concentration gradient of phosphorus can be obtained. The rapidly quenching to the room temperature or lower can be performed, for example, by putting the powder after firing into liquid nitrogen. The phosphorus oxide is decomposed by heating at 350° C., the phosphorus oxide is uniformly dispersed inside the raw material particle by heating at 800° C., and by heating at 1000° C., it is possible to obtain the phosphorus-containing niobium-titanium composite oxide having the concentration gradient of phosphorus and the target composition. Excessive phosphorus present inside the particle can precipitates toward the crystal grain boundary portion (primary particle surface) between the primary particles during firing. By rapidly quenching in this process, it is possible to obtain the primary particle containing the phosphorus-containing niobium-titanium composite oxide having the concentration gradient of phosphorus.

According to the first synthesis method, a particle in which the surface of primary particle is phosphorus oxide can also be produced. Further, according to the first synthesis method, a phosphate compound is present between a plurality of primary particles, and a secondary particle formed by granulation of these primary particles can also be produced.

Furthermore, according to the second synthesis method described below, it is possible to produce a particle in which the primary particle surface of the phosphorus-containing monoclinic niobium-titanium composite oxide is a phosphate compound except for phosphorus oxide. As described above, examples of the phosphate compound include lithium phosphate, potassium phosphate, sodium phosphate, magnesium phosphate, titanium phosphate, zirconium phosphate, manganese phosphate, iron phosphate, aluminum phosphate, tantalum phosphate, tungsten phosphate, niobium phosphate, molybdenum phosphate, bismuth phosphate, and the like.

(Second Synthesis Method)

First, in addition to various salts such as niobium oxide, titanium oxide, and oxides or carbonates of additional elements (M1 and M2 below), $P_2O_5$ as a phosphorus source is prepared. At this time, for example, the phosphorus source is added so that phosphorus is in excess of 10 mol % to 500 mol %, more than a molar amount represented by the general formula $Ti_{1-x}M1_xNb_{2-y-z}M2_yP_zO_7$, which is a target composition. Next, after heating at 350° C. for 2 hours, cooling is performed to room temperature.

To the powder obtained after cooling, for example, oxides or carbonates of lithium, potassium, sodium, magnesium, titanium, zirconium, manganese, iron, aluminum, tantalum, tungsten, niobium, molybdenum and bismuth are added in a predetermined number of moles. For example, in the case of producing an active material particle containing the iron phosphate and/or potassium phosphate on the surface of the primary particle, a predetermined number of moles of iron oxide and/or potassium carbonate are added.

Then, firing is performed at 800° C. for 12 hours and at 1000° C. for 2 hours. Thereafter, by rapidly quenching to room temperature or lower, the niobium-titanium composite oxide particle having a concentration gradient of phosphorus can be obtained. The rapidly quenching to the room temperature or lower can be performed, for example, by putting the powder after firing into liquid nitrogen. The phosphorus oxide is decomposed by heating at 350° C., the phosphorus oxide is uniformly dispersed inside the raw material particle by heating at 800° C., and by heating at 1000° C., it is possible to obtain the primary particle of the phosphorus-containing niobium-titanium composite oxide having the concentration gradient of phosphorus and the target composition. When excessive phosphorus present inside the particle precipitates toward the crystal grain boundary part (primary particle surface) between the primary particles during firing, iron and potassium react with phosphorus to form iron phosphate and/or potassium phosphate on the primary particle surface. On the other hand, by rapidly quenching in this process, it is possible to obtain the primary particle containing the phosphorus-containing niobium-titanium composite oxide having the concentration gradient of phosphorus.

Further, according to the second synthesis method, a phosphate compound is present between a plurality of primary particles, and a secondary particle formed by granulation of these primary particles can also be produced.

According to a first embodiment, an active material is provided. The active material includes a primary particle containing a phosphorus-containing monoclinic niobium-titanium composite oxide. The primary particle has a concentration gradient in which a phosphorus concentration increases from the gravity point of the primary particle toward the surface of the primary particle. According to the active material, a secondary battery capable of achieving excellent rate characteristics can be realized.

Second Embodiment

According to the second embodiment, an electrode is provided.

The electrode according to the second embodiment includes the active material according to the first embodiment. This electrode may be a battery electrode containing the active material according to the first embodiment as an active material for a battery. The electrode as a battery electrode may be, for example, a negative electrode containing the active material according to the first embodiment as a negative electrode active material.

The electrode according to the second embodiment may include a current collector and an active material-containing layer. The active material-containing layer may be formed on both of reverse surfaces or one surface of the current collector. The active material-containing layer may contain the active material, and optionally an electro-conductive agent and a binder.

The active material-containing layer may singly include the active material according to the first embodiment or include two or more kinds of the active material according to the first embodiment. Furthermore, a mixture where one kind or two or more kinds of the active material according to the first embodiment is further mixed with one kind or two or more kinds of another active material may also be included.

For example, in a case where the active material according to the first embodiment is included as the negative electrode active material, examples of other active materials include lithium titanate having a ramsdellite structure (e.g., $Li_{2+y}Ti_3O_7$, $0<y\leq3$), lithium titanate having a spinel structure (e.g., $Li_{4+x}Ti_5O_{12}$, $0<x\leq3$), monoclinic titanium dioxide ($TiO_2$), anatase type titanium dioxide, rutile type titanium dioxide, a hollandite type titanium composite oxide, and an orthorhombic titanium-containing composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \le a \le 6$, $0 \le b < 2$, $0 \le c < 6$, $0 \le d < 6$, and $-0.5 \le \sigma \le 0.5$. Specific examples of the orthorhombic titanium-containing composite oxide include $Li_{2+a}Na_2Ti_6O_{14}$ ($0 \le a \le 6$).

The electro-conductive agent is added to improve current collection performance and to suppress the contact resistance between the active material and the current collector. Examples of the electro-conductive agent include carbonaceous substances such as vapor grown carbon fiber (VGCF), carbon blacks such as acetylene black, and graphite. One of these may be used as the electro-conductive agent, or two or more may be used in combination as the electro-conductive agent. Alternatively, instead of using an electro-conductive agent, a carbon coating or an electro-conductive inorganic material coating may be applied to the surface of the active material particle.

The binder is added to fill gaps among the dispersed active material and also to bind the active material with the current collector. Examples of the binder include polytetrafluoroethylene (PTFE), polyvinylidene fluoride (PVdF), fluorine rubber, styrene-butadiene rubber, polyacrylate compounds, imide compounds, carboxymethyl cellulose (CMC), and salts of CMC. One of these may be used as the binder, or two or more may be used in combination as the binder.

The blending proportion of active material, electro-conductive agent and binder in the active material-containing layer may be appropriately changed according to the use of the electrode. For example, in the case of using the electrode as a negative electrode of a secondary battery, the active material (negative electrode active material), electro-conductive agent and binder in the active material-containing layer are preferably blended in proportions of 68% by mass to 96% by mass, 2% by mass to 30% by mass, and 2% by mass to 30% by mass, respectively. When the amount of electro-conductive agent is 2% by mass or more, the current collection performance of the active material-containing layer can be improved. When the amount of binder is 2% by mass or more, binding between the active material-containing layer and current collector is sufficient, and excellent cycling performances can be expected. On the other hand, an amount of each of the electro-conductive agent and binder is preferably 30% by mass or less, in view of increasing the capacity.

There may be used for the current collector, a material which is electrochemically stable at the potential (vs. $Li/Li^+$) at which lithium (Li) is inserted into and extracted from active material. For example in the case where the active material is used as a negative electrode active material, the current collector is preferably made of copper, nickel, stainless steel, aluminum, or an aluminum alloy including one or more elements selected from the group consisting of Mg, Ti, Zn, Mn, Fe, Cu, and Si. The thickness of the current collector is preferably from 5 μm to 20 μm. The current collector having such a thickness can maintain balance between the strength and weight reduction of the electrode.

The current collector may include a portion where the active material-containing layer is not formed on a surface of the current collector. This portion may serve as an electrode tab.

The electrode may be produced by the following method, for example. First, active material, electro-conductive agent, and binder are suspended in a solvent to prepare a slurry. The slurry is applied onto one surface or both of reverse surfaces of a current collector. Next, the applied slurry is dried to form a layered stack of active material-containing layer and current collector. Then, the layered stack is subjected to pressing. The electrode can be produced in this manner.

Alternatively, the electrode may also be produced by the following method. First, active material, electro-conductive agent, and binder are mixed to obtain a mixture. Next, the mixture is formed into pellets. Then the electrode can be obtained by arranging the pellets on the current collector.

The electrode according to the second embodiment includes the active material according to the first embodiment. Therefore, the electrode can realize a secondary battery capable of achieving excellent rate characteristics.

Third Embodiment

According to a third embodiment, there is provided a secondary battery including a negative electrode, a positive electrode, and an electrolyte. The secondary battery includes the electrode according to the second embodiment as the negative electrode. That is, the secondary battery according to the third embodiment includes, as the negative electrode, the electrode containing the active material according to the first embodiment as a battery active material.

The secondary battery according to the third embodiment may further include a separator provided between the positive electrode and the negative electrode. The negative electrode, the positive electrode, and the separator can structure an electrode group. The electrolyte may be held in the electrode group.

The secondary battery according to the third embodiment may further include a container member that houses the electrode group and the electrolyte.

The secondary battery according to the third embodiment may further include a negative electrode terminal electrically connected to the negative electrode and a positive electrode terminal electrically connected to the positive electrode.

The secondary battery according to the third embodiment may be, for example, a lithium ion secondary battery. The secondary battery also includes nonaqueous electrolyte secondary batteries containing nonaqueous electrolyte(s).

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode active material-containing layer. The negative electrode current collector and the negative electrode active material-containing layer may be respectively a current collector and an active material-containing layer that may be included in the electrode according to the second embodiment. The negative electrode active material-containing layer contains the active material according to the first embodiment as a negative electrode active material.

Of the details of the negative electrode, parts overlapping with the details described in the second embodiment are omitted.

The density of the negative electrode active material-containing layer (excluding the current collector) is preferably from 1.8 g/cm³ to 3.5 g/cm³. The negative electrode, in which the density of the negative electrode active material-containing layer is within this range, is excellent in energy density and ability to hold the electrolyte. The density of the negative electrode active material-containing layer is more preferably from 2.5 g/cm$^3$ to 2.9 g/cm$^3$.

The negative electrode may be produced by a method similar to that for the electrode according to the second embodiment, for example.

(2) Positive Electrode

The positive electrode may include a positive electrode current collector and a positive electrode active material-containing layer. The positive electrode active material-containing layer may be formed on one surface or both of reverse surfaces of the positive electrode current collector. The positive electrode active material-containing layer may include a positive electrode active material, and optionally an electro-conductive agent and a binder.

As the positive electrode active material, for example, an oxide or a sulfide may be used. The positive electrode may singly include one kind of compound as the positive electrode active material, or alternatively, include two or more kinds of compounds in combination. Examples of the oxide and sulfide include compounds capable of having Li and Li ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}O_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, $y+z<1$).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x<1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, $y+z<1$). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of lithium ions within solid can proceed smoothly.

The specific surface area of the positive electrode active material is preferably from 0.1 m$^2$/g to 10 m$^2$/g. The positive electrode active material having a specific surface area of 0.1 m$^2$/g or more can secure sufficient sites for inserting and extracting Li ions. The positive electrode active material having a specific surface area of 10 m$^2$/g or less is easy to handle during industrial production, and can secure a good charge and discharge cycle performance.

The binder is added to fill gaps among the dispersed positive electrode active material and also to bind the positive electrode active material with the positive electrode current collector. Examples of the binder include polytetrafluoroethylene (PTFE), polyvinylidene fluoride (PVdF), fluorine rubber, polyacrylate compounds, imide compounds, carboxymethyl cellulose (CMC), and salts of CMC. One of these may be used as the binder, or two or more may be used in combination as the binder.

The electro-conductive agent is added to improve current collection performance and to suppress the contact resistance between the positive electrode active material and the positive electrode current collector. Examples of the electro-conductive agent include carbonaceous substances such as vapor grown carbon fiber (VGCF), carbon black such as acetylene black, and graphite. One of these may be used as the electro-conductive agent, or two or more may be used in combination as the electro-conductive agent. The electro-conductive agent may be omitted.

In the positive electrode active material-containing layer, the positive electrode active material and binder are preferably blended in proportions of 80% by mass to 98% by mass, and 2% by mass to 20% by mass, respectively.

When the amount of the binder is 2% by mass or more, sufficient electrode strength can be achieved. The binder may serve as an electrical insulator. Thus, when the amount of the binder is 20% by mass or less, the amount of insulator in the electrode is reduced, and thereby the internal resistance can be decreased.

When an electro-conductive agent is added, the positive electrode active material, binder, and electro-conductive agent are preferably blended in proportions of 77% by mass to 95% by mass, 2% by mass to 20% by mass, and 3% by mass to 15% by mass, respectively.

When the amount of the electro-conductive agent is 3% by mass or more, the above-described effects can be expressed. By setting the amount of the electro-conductive agent to 15% by mass or less, the proportion of electro-conductive agent that contacts the electrolyte can be made low. When this proportion is low, the decomposition of an electrolyte can be reduced during storage under high temperatures.

The positive electrode current collector is preferably an aluminum foil, or an aluminum alloy foil containing one or more elements selected from the group consisting of Mg, Ti, Zn, Ni, Cr, Mn, Fe, Cu, and Si.

The thickness of the aluminum foil or aluminum alloy foil, is preferably from 5 μm to 20 μm, and more preferably 15 μm or less. The purity of the aluminum foil is preferably 99% by mass or more. The amount of transition metal such as iron, copper, nickel, or chromium contained in the aluminum foil or aluminum alloy foil is preferably 1% by mass or less.

The positive electrode current collector may include a portion where a positive electrode active material-containing layer is not formed on a surface of the positive electrode current collector. This portion may serve as a positive electrode tab.

The positive electrode may be produced by a method similar to that for the electrode according to the second embodiment, for example, using a positive electrode active material.

(3) Electrolyte

As the electrolyte, for example, a liquid nonaqueous electrolyte or gel nonaqueous electrolyte may be used. The liquid nonaqueous electrolyte is prepared by dissolving an electrolyte salt as solute in an organic solvent. The concentration of electrolyte salt is preferably from 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GBL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVdF), polyacrylonitrile (PAN), polyethylene oxide (PEO), and mixtures thereof.

Alternatively, other than the liquid nonaqueous electrolyte and gel nonaqueous electrolyte, a room temperature molten salt (ionic melt) including lithium ions, a polymer solid electrolyte, an inorganic solid electrolyte, or the like may be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone, as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

The polymer solid electrolyte is prepared by dissolving the electrolyte salt in a polymeric material, and solidifying it.

The inorganic solid electrolyte is a solid substance having Li ion conductivity.

(4) Separator

The separator may be made of, for example, a porous film or synthetic resin nonwoven fabric including polyethylene (PE), polypropylene (PP), cellulose, or polyvinylidene fluoride (PVdF). In view of safety, a porous film made of polyethylene or polypropylene is preferred. This is because such a porous film melts at a fixed temperature and thus able to shut off current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

Next, the secondary battery according to the third embodiment will be more specifically described with reference to the drawings.

Figure 4:
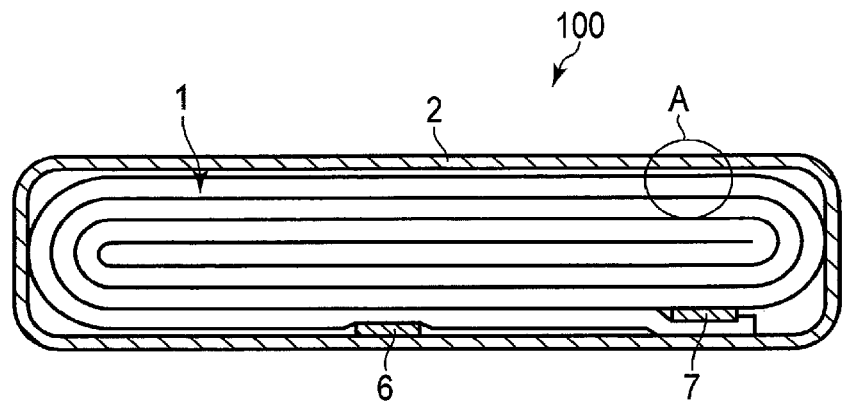
Figure 5:
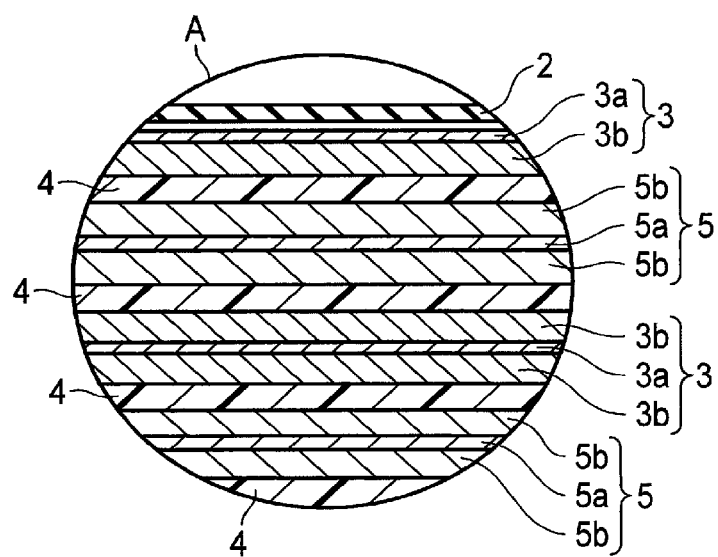

FIG. 4 is a cross-sectional view schematically showing an example of a secondary battery according to the third embodiment. FIG. 5 is an enlarged cross-sectional view of section A of the secondary battery shown in FIG. 4.

The secondary battery 100 shown in FIGS. 4 and 5 includes a bag-shaped container member 2 shown in FIGS.

4 and 5, an electrode group 1 shown in FIG. 4, and an electrolyte, which is not shown. The electrode group 1 and the electrolyte are housed in the bag-shaped container member 2. The electrolyte (not shown) is held in the electrode group 1.

The bag-shaped container member 2 is made of a laminate film including two resin layers and a metal layer sandwiched between the resin layers.

As shown in FIG. 4, the electrode group 1 is a wound electrode group in a flat form. The wound electrode group 1 in a flat form includes a negative electrode 3, a separator 4, and a positive electrode 5, as shown in FIG. 5. The separator 4 is sandwiched between the negative electrode 3 and the positive electrode 5.

The negative electrode 3 includes a negative electrode current collector 3a and a negative electrode active material-containing layer 3b. At the portion of the negative electrode 3 positioned outermost among the wound electrode group 1, the negative electrode active material-containing layer 3b is formed only on an inner surface of the negative electrode current collector 3a, as shown in FIG. 4. For the other portions of the negative electrode 3, negative electrode active material-containing layers 3b are formed on both of reverse surfaces of the negative electrode current collector 3a.

The positive electrode 5 includes a positive electrode current collector 5a and positive electrode active material-containing layers 5b formed on both of reverse surfaces of the positive electrode current collector 5a.

As shown in FIG. 4, a negative electrode terminal and positive electrode terminal 7 are positioned in vicinity of the outer peripheral edge of the wound electrode group 1. The negative electrode terminal 6 is connected to a portion of the negative electrode current collector 3a positioned outermost. The positive electrode terminal 7 is connected to a portion of the positive electrode current collector 5a positioned outermost. The negative electrode terminal 6 and the positive electrode terminal 7 extend out from an opening of the bag-shaped container member 2. A thermoplastic resin layer is provided on the inner surface of the bag-shaped container member 2, and the opening is sealed by heat-sealing the resin layer.

Figure 6:
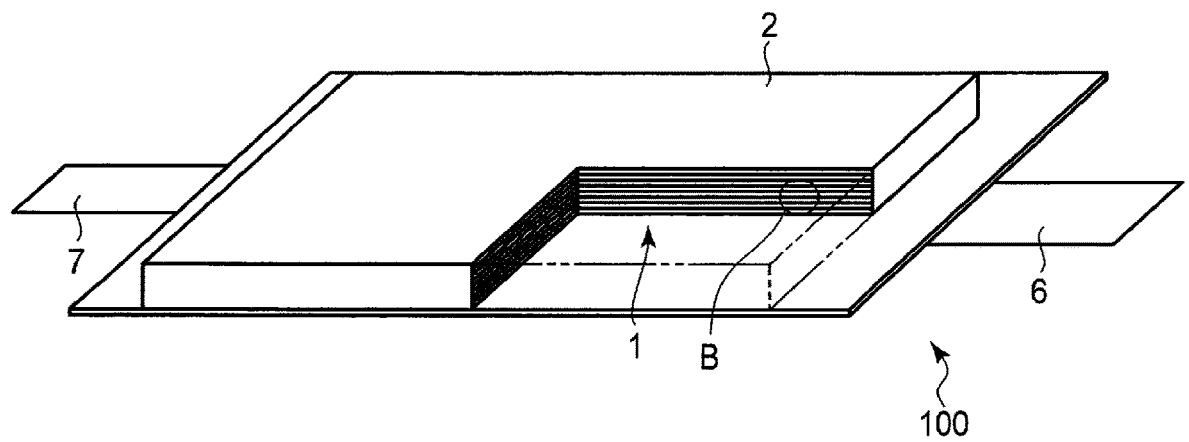
Figure 7:
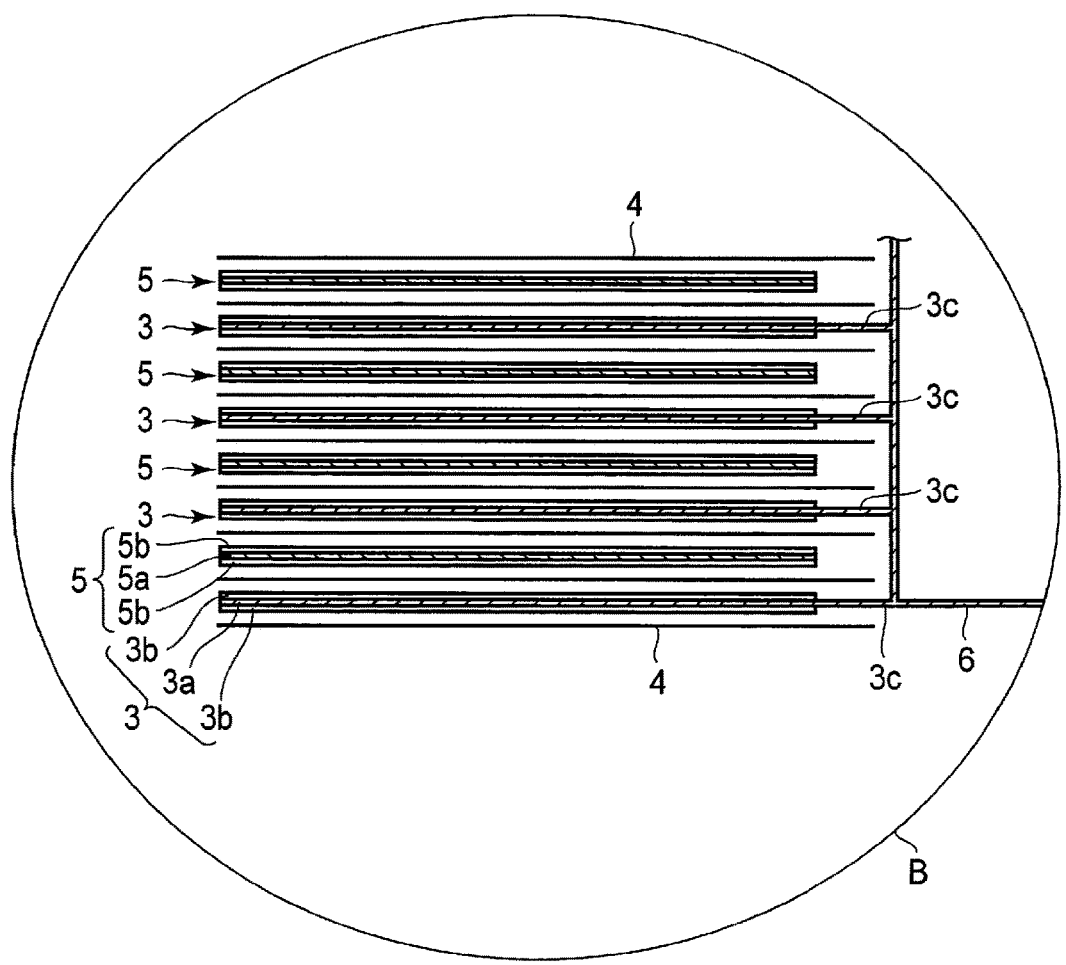

The secondary battery according to the third embodiment is not limited to the secondary battery of the structure shown in FIGS. 4 and 5, and may be, for example, a battery of a structure as shown in FIGS. 6 and 7.

FIG. 6 is a partially cut-out perspective view schematically showing another example of a secondary battery according to the third embodiment. FIG. 7 is an enlarged cross-sectional view of section B of the secondary battery shown in FIG. 6.

The secondary battery 100 shown in FIGS. 6 and 7 includes an electrode group 1 shown in FIGS. 6 and 7, a container member 2 shown in FIG. 6, and an electrolyte, which is not shown. The electrode group 1 and the electrolyte are housed in the container member 2. The electrolyte is held in the electrode group 1.

The container member 2 is made of a laminate film including two resin layers and a metal layer sandwiched between the resin layers.

As shown in FIG. 7, the electrode group 1 is a stacked electrode group. The stacked electrode group 1 has a structure in which and negative electrodes 3 and positive electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end, a portion 3c where the negative electrode active material-containing layer 3b is not supported on either surface. This portion 3c serves as a negative electrode tab. As shown in FIG. 7, the portions 3c serving as the negative electrode tabs do not overlap the positive electrodes 5. The plural negative electrode tabs (portions 3c) are electrically connected to the strip-shaped negative electrode terminal 6. A tip of the strip-shaped negative electrode terminal 6 is drawn to the outside from the container member 2.

Although not shown, the positive electrode current collector 5a of each of the positive electrodes 5 includes at one end, a portion where the positive electrode active material-containing layer 5b is not supported on either surface. This portion serves as a positive electrode tab. Like the negative electrode tabs (portion 3c), the positive electrode tabs do not overlap the negative electrodes 3. Further, the positive electrode tabs are located on the opposite side of the electrode group 1 with respect to the negative electrode tabs (portion 3c). The positive electrode tabs are electrically connected to the strip-shaped positive electrode terminal 7. A tip of the strip-shaped positive electrode terminal 7 is located on the opposite side relative to the negative electrode terminal 6 and drawn to the outside from the container member 2.

The secondary battery according to the third embodiment includes the active material according to the first embodiment as a negative electrode active material. Therefore, the secondary battery can exhibit excellent rate characteristics.

Fourth Embodiment

According to a fourth embodiment, a battery module is provided. The battery module according to the fourth embodiment includes plural secondary batteries according to the third embodiment.

In the battery module according to the fourth embodiment, each of the single batteries may be arranged electrically connected in series, in parallel, or in a combination of in-series connection and in-parallel connection.

An example of the battery module according to the fourth embodiment will be described next with reference to the drawings.

FIG. 8 is a perspective view schematically showing an example of the battery module according to the fourth embodiment. A battery module 200 shown in FIG. 8 includes five single-batteries 100a to 100e, four bus bars 21, a positive electrode-side lead 22, and a negative electrode-side lead 23. Each of the five single-batteries 100a to 100e is a secondary battery according to the third embodiment.

The bus bar 21 connects, for example, a negative electrode terminal 6 of one single-battery 100a and a positive electrode terminal 7 of the single-battery 100b positioned adjacent. In such a manner, five single-batteries 100 are thus connected in series by the four bus bars 21. That is, the battery module 200 shown in FIG. 8 is a battery module of five in-series connection.

As shown in FIG. 8, the positive electrode terminal 7 of the single-battery 100a located at left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection.

The battery module according to the fourth embodiment includes the secondary battery according to the third embodiment. Therefore, the battery module can exhibit excellent rate characteristics.

Fifth Embodiment

According to a fifth embodiment, a battery pack is provided. The battery pack includes a battery module according to the fourth embodiment. The battery pack may include a single secondary battery according to the third embodiment, in place of the battery module according to the fourth embodiment.

The battery pack according to the fifth embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the fifth embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of motive force of vehicles such as automobiles) is provided to the battery pack via the external power distribution terminal.

Next, an example of a battery pack according to the fifth embodiment will be described with reference to the drawings.

Figure 9:
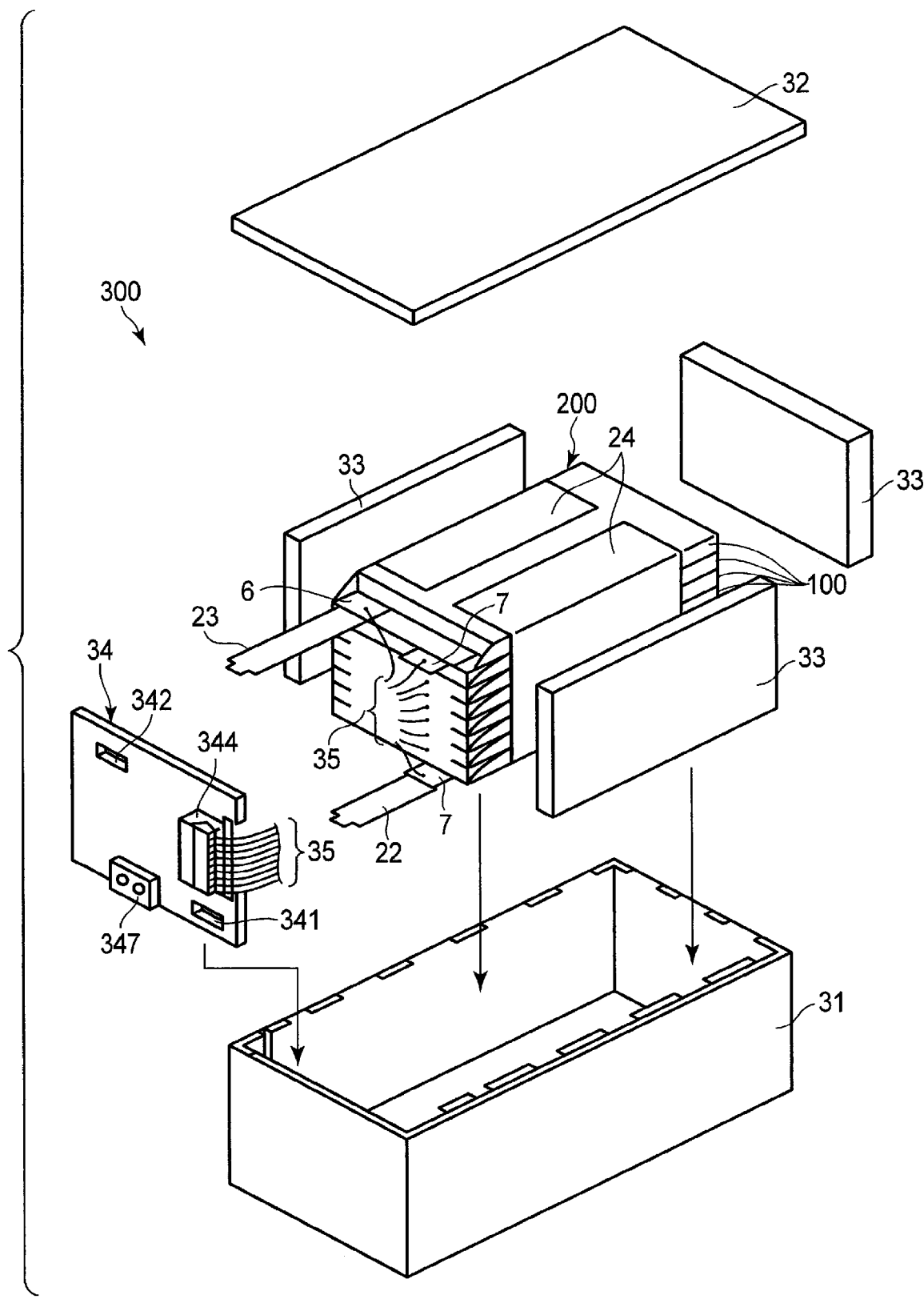

FIG. 9 is an exploded perspective view schematically showing an example of the battery pack according to the fifth embodiment. FIG. 10 is a block diagram showing an example of an electric circuit of the battery pack shown in FIG. 9.

A battery pack 300 shown in FIGS. 9 and 10 includes a housing container 31, a lid 32, protective sheets 33, a battery module 200, a printed wiring board 34, wires 35, and an insulating plate (not shown).

The housing container 31 shown in FIG. 9 is a square bottomed container having a rectangular bottom surface. The housing container 31 is configured to be capable of storing the protection sheets 33, the battery module 200, the printed wiring board 34, and the wires 35. The lid 32 has a rectangular shape. The lid 32 covers the housing container 31 to house the battery module 200 and such. The housing container 31 and the lid 32 are provided with openings, connection terminals, or the like (not shown) for connection to an external device or the like.

The battery module 200 includes plural single-batteries 100, a positive electrode-side lead 22, a negative electrode-side lead 23, and adhesive tape(s) 24.

A single-battery 100 has a structure shown in FIGS. 4 and 5. At least one of the plural single-batteries 100 is a secondary battery according to the third embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 9. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is provided along one face in the short-side direction among the inner surfaces of the housing container 31. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long-side direction and on the inner surface along the short-side direction facing the printed wiring board 34 across the battery module 200 positioned therebetween. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347 to external device(s), based on detection signals transmitted from the thermistor 343 or detection signals transmitted from each single-battery 100 or the battery module 200.

An example of the detection signal transmitted from the thermistor 343 is a signal indicating that the temperature of the single-battery (single-batteries) 100 is detected to be a predetermined temperature or more. An example of the detection signal transmitted from each single-battery 100 or the battery module 200 include a signal indicating detection of over-charge, over-discharge, and overcurrent of the single-battery (single-batteries) 100. When detecting overcharge or the like for each of the single batteries 100, the battery voltage may be detected, or a positive electrode potential or negative electrode potential may be detected. In the latter case, a lithium electrode to be used as a reference electrode may be inserted into each single battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200 via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used, for example, in applications where excellent cycle performance is demanded when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the fifth embodiment includes the secondary battery according to the third embodiment or the battery module according to the fourth embodiment. Therefore, the battery pack can exhibit excellent rate characteristics.

Sixth Embodiment

According to a sixth embodiment, a vehicle is provided. The vehicle includes the battery pack according to the fifth embodiment.

In the vehicle according to the sixth embodiment, the battery pack is configured, for example, to recover regenerative energy from motive force of the vehicle. The vehicle may include a mechanism configured to convert kinetic energy of the vehicle into regenerative energy.

Examples of the vehicle according to the sixth embodiment include two-wheeled to four-wheeled hybrid electric automobiles, two-wheeled to four-wheeled electric automobiles, electrically assisted bicycles, and railway cars.

In the vehicle according to the sixth embodiment, the installing position of the battery pack is not particularly limited. For example, the battery pack may be installed in the engine compartment of the vehicle, in rear parts of the vehicle, or under seats.

The vehicle according to the sixth embodiment may have plural battery packs installed. In such a case, the battery packs may be electrically connected in series, electrically connected in parallel, or electrically connected in a combination of in-series connection and in-parallel connection.

An example of the vehicle according to the sixth embodiment is explained below, with reference to the drawings.

FIG. 11 is a cross-sectional view schematically showing an example of a vehicle according to the sixth embodiment.

A vehicle 400, shown in FIG. 11 includes a vehicle body 40 and a battery pack 300 according to the fifth embodiment. In the example shown in FIG. 11, the vehicle 400 is a four-wheeled automobile.

The vehicle 400 may have plural battery packs 300 installed. In such a case, the battery packs 300 may be connected in series, connected in parallel, or connected in a combination of in-series connection and in-parallel connection.

In FIG. 11, the battery pack 300 is installed in an engine compartment located at the front of the vehicle body 40. As mentioned above, for example, the battery pack 300 may be alternatively installed in rear sections of the vehicle body 40, or under a seat. The battery pack 300 may be used as a power source of the vehicle 400. The battery pack 300 can also recover regenerative energy of motive force of the vehicle 400.

Figure 12:
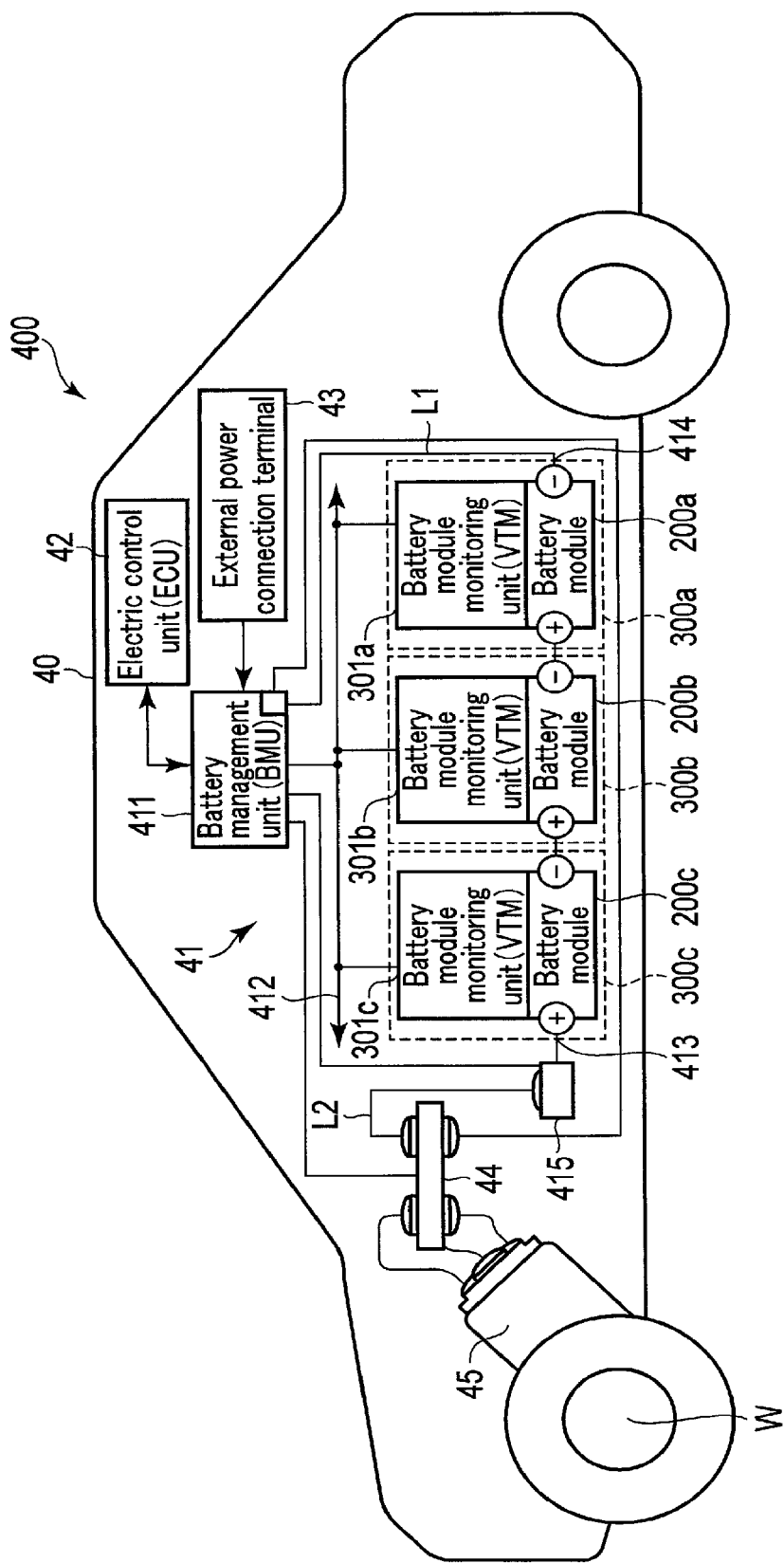

Next, with reference to FIG. 12, an aspect of operation of the vehicle according to the sixth embodiment is explained.

FIG. 12 is a view schematically showing another example of the vehicle according to the sixth embodiment. A vehicle 400, shown in FIG. 12, is an electric automobile.

The vehicle 400, shown in FIG. 12, includes a vehicle body 40, a vehicle power source 41, a vehicle ECU (electric control unit) 42, which is a master controller of the vehicle power source 41, an external terminal (an external power connection terminal) 43, an inverter 44, and a drive motor 45.

The vehicle 400 includes the vehicle power source 41, for example, in the engine compartment, in the rear sections of the automobile body, or under a seat. In FIG. 12, the position of the vehicle power source 41 installed in the vehicle 400 is schematically shown.

The vehicle power source 41 includes plural (for example, three) battery packs 300a, 300b and 300c, battery management unit (EMU) 411, and a communication bus 412.

The three battery packs 300a, 300b and 300c are electrically connected in series. The battery pack 300a includes a battery module 200a and a battery module monitoring unit 301a (e.g., a VTM: voltage temperature monitoring). The battery pack 300b includes a battery module 200b, and a battery module monitoring unit 301b. The battery pack 300c includes a battery module 200c, and a battery module monitoring unit 301c. The battery packs 300a, 300b and 300c can each be independently removed, and may be exchanged by a different battery pack 300.

Each of the battery modules 200a to 200c includes plural single-batteries connected in series. At least one of the plural single-batteries is the secondary battery according to the third embodiment. The battery modules 200a to 200c each perform charging and discharging via a positive electrode terminal 413 and a negative electrode terminal 414.

In order to collect information concerning security of the vehicle power source 41, the battery management unit 411 performs communication with the battery module monitoring units 301a to 301c and collects information such as voltages or temperatures of the single-batteries 100 included in the battery modules 200a to 200c included in the vehicle power source 41.

The communication bus 412 is connected between the battery management unit 411 and the battery module monitoring units 301a to 301c. The communication bus 412 is configured so that multiple nodes (i.e., the battery management unit and one or more battery module monitoring units) share a set of communication lines. The communication bus 412 is, for example, a communication bus configured based on CAN (Control Area Network) standard.

The battery module monitoring units 301a to 301c measure a voltage and a temperature of each single-battery in the battery modules 200a to 200c based on commands from the battery management unit 411. It is possible, however, to measure the temperatures only at several points per battery module, and the temperatures of all of the single-batteries need not be measured.

The vehicle power source 41 may also have an electromagnetic contactor (for example, a switch unit 415 shown in FIG. 12) for switching connection between the positive electrode terminal 413 and the negative electrode terminal 414. The switch unit 415 includes a precharge switch (not shown), which is turned on when the battery modules 200a to 200c are charged, and a main switch (not shown), which is turned on when battery output is supplied to a load. The precharge switch and the main switch include a relay circuit (not shown), which is turned on or off based on a signal provided to a coil disposed near the switch elements.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 controls an output voltage based on control signals from the battery management unit 411 or the vehicle ECU 42, which controls the entire operation of the vehicle.

The drive motor 45 is rotated by electric power supplied from the inverter 44. The rotation is transferred to an axle and driving wheels W via a differential gear unit, for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The direct current is inputted into the vehicle power source 41.

One terminal of a connecting line L1 is connected via a current detector (not shown) in the battery management unit 411 to the negative electrode terminal 414 of the vehicle power source 41. The other terminal of the connecting line L1 is connected to a negative electrode input terminal of the inverter 44.

One terminal of a connecting line L2 is connected via the switch unit 415 to the positive electrode terminal 413 of the vehicle power source 41. The other terminal of the connecting line L2 is connected to a positive electrode input terminal of the inverter 44.

The external terminal 43 is connected to the battery management unit 411. The external terminal 43 is able to connect, for example, to an external power source.

The vehicle ECU 42 cooperatively controls the battery management unit 411 together with other units in response to inputs operated by a driver or the like, thereby performing the management of the whole vehicle. Data concerning the security of the vehicle power source 41, such as a remaining capacity of the vehicle power source 41, are transferred between the battery management unit 411 and the vehicle ECU 42 via communication lines.

The vehicle according to the sixth embodiment includes the battery pack according to the fifth embodiment. Therefore, according to the present embodiment, it is possible to provide a vehicle including a battery pack that can exhibit excellent rate characteristics.

EXAMPLES

Hereinafter, the above embodiment will be described in more detail based on examples.

Example 1

(Preparation of Active Material Particles)

First, titanium dioxide, niobium pentoxide, and phosphorus pentoxide were mixed at a molar ratio of 1.0000:0.9995:0.000525, respectively, and a raw material mixed powder was prepared using a ball mill. Next, this mixture was placed in a gold boat (boat made of gold) and pre-fired at 350° C. for 2 hours. Next, the powder after the pre-firing was transferred to a platinum crucible and used for first main firing. The first main firing was performed at 800° C. for 12 hours. Thereafter, the obtained powder was ground again using a ball mill for 1 hour. This powder was placed in a platinum crucible, subjected to second main firing, and then rapidly quenched with liquid nitrogen to obtain an active material according to Example 1. The obtained active material particles contained primary particles and secondary particles. The second main firing and rapidly quenching treatment was performed by firing at a firing temperature of 1000° C. for 2 hours with a temperature rise rate of 10° C./min and then taken out of an electric furnace promptly and placed into the liquid nitrogen together with the platinum crucible.

(Formation of Carbon-Containing Layer on Particle Surface)

Next, the active material particles obtained by the above-described method were loaded with a carbon body to obtain an active material powder having a carbon-containing layer on the primary particles surface and the secondary particle surfaces. Specifically, first, polyvinyl alcohol (PVA) and pure water were mixed to prepare a PVA aqueous solution. A concentration of PVA in the PVA aqueous solution was 15% by mass. Subsequently, the active material particles were added to the aqueous PVA solution and stirred to prepare a dispersion liquid. Next, this dispersion liquid was subjected to spray drying to obtain a powder sample. This powder sample was further dried at a temperature of 100° C. for 12 hours to obtain active material particles supporting unfired carbon bodies. Subsequently, the active material particles were subjected to carbonization treatment in a reducing atmosphere at a temperature of 700° C. for 1 hour to obtain an active material powder having a carbon-containing layer on the particle surfaces.

(Preparation of Negative Electrode)

A negative electrode was prepared as follows.

First, 100 parts by mass of active material particles, 6 parts by mass of a conductive agent and 4 parts by mass of a binder were dispersed in a solvent to prepare a slurry. As the active material particles, an active material powder obtained by the above-described method, and having a carbon-containing layer on the particle surface was used. As the conductive agent, a mixture of acetylene black and graphite was used. In this mixture, a mass ratio of acetylene black and graphite was 1:2. As the binder, a mixture of carboxyl methyl cellulose (CMC) and styrene butadiene rubber (SBR) was used. In this mixture, a mass ratio of CMC and SBR was 1:1. As the solvent, pure water was used.

Subsequently, the obtained slurry was applied to both sides of the current collector, and the coating film was dried to form an active material-containing layer. As the current collector, an aluminum foil having a thickness of was used. This was dried under vacuum at 130° C. for 12 hours, and the current collector and the active material-containing layer were rolled with a roll press machine to obtain a negative electrode. Press pressure was made common to Examples and Comparative Examples.

In order to measure a unipolar capacity at the negative electrode, a three-electrode beaker cell was prepared by using the electrode (negative electrode) obtained by the above-described method as a working electrode, metallic lithium foil as a counter electrode and a reference electrode, and using a nonaqueous electrolyte prepared by a method described late.

In this three-electrode beaker cell for measurement, the lithium metal is used as the counter electrode, so that the potential of the electrode (negative electrode) produced in each of Examples and Comparative Examples is nobler than that of the counter electrode. Hence the prepared electrode (negative electrode) operates as a positive electrode. Therefore, the definitions of charge and discharge become opposite when the electrodes of each of Examples and Comparative Example is used as the negative electrode. Here, in the present examples, in order to avoid confusion, directions in which lithium ions are inserted into the electrode are collectively referred to as charge, and directions in which lithium ions are extracted are consistently referred to as discharge. Note that the active material of the present embodiment operates as a negative electrode by combining with a known positive electrode material.

(Preparation of Nonaqueous Electrolyte)

As a mixed solvent, a mixed solvent of ethylene carbonate and diethyl carbonate (volume ratio 1:1) was prepared. A nonaqueous electrolyte was prepared by dissolving lithium hexafluorophosphate (LiPF$_6$) at a concentration of 1M in this solvent.

Example 2

An active material was obtained in the same manner as described in Example 1 except that titanium dioxide, niobium pentoxide, and phosphorus pentoxide were mixed at a molar ratio of 1.000:0.995:0.05, respectively, and the raw material mixed powder was prepared using a ball mill. The obtained active material particles contained primary particles and secondary particles. Thereafter, a three-electrode beaker cell was prepared in the same manner as described in Example 1 except that the above active material was used.

Example 3

An active material was obtained in the same manner as described in Example 1 except that titanium dioxide, niobium pentoxide, and phosphorus pentoxide were mixed at a molar ratio of 1.000:0.995:0.25, respectively, and the raw material mixed powder was prepared using a ball mill. The obtained active material particles contained primary particles and secondary particles. Thereafter, a three-electrode beaker cell was prepared in the same manner as described in Example 1 except that the above active material was used.

Example 4

An active material was obtained in the same manner as described in Example 1 except that titanium dioxide, niobium pentoxide, and phosphorus pentoxide were mixed at a molar ratio of 1.000:0.995:0.5 and a raw material mixed powder was prepared using a ball mill. The obtained active material particles contained primary particles and secondary particles. Thereafter, a three-electrode beaker cell was prepared in the same manner as described in Example 1 except that the above active material was used.

Example 5

An active material was obtained in the same manner as described in Example 1 except that titanium dioxide, niobium pentoxide, and phosphorus pentoxide were mixed at a molar ratio of 1.000:0.975:0.53, respectively, and the raw material mixed powder was prepared using a ball mill. The obtained active material particles contained primary particles and secondary particles. Thereafter, a three-electrode beaker cell was prepared in the same manner as described in Example 1 except that the above active material was used.

Example 6

An active material was obtained in the same manner as described in Example 1 except that titanium dioxide, niobium pentoxide, and phosphorus pentoxide were mixed at a molar ratio of 1.000:0.95:0.25, respectively, and the raw material mixed powder was prepared using a ball mill. The obtained active material particles contained primary particles and secondary particles. Thereafter, a three-electrode beaker cell was prepared in the same manner as described in Example 1 except that the above active material was used.

Example 7

Titanium dioxide, niobium pentoxide, and phosphorus pentoxide were mixed at a molar ratio of 1.000:0.95:0.25, respectively, and a raw material mixed powder was prepared using a ball mill. This mixture was placed in a gold boat and pre-fired at 350° C. for 2 hours, and then the resultant powder was cooled to room temperature. Next, potassium carbonate was added to the resultant powder so as to be equimolar to the phosphorus pentoxide used as a raw material, and the powder was mixed in a ball mill to prepare a powder. This powder was subjected to the first main firing, the second main firing, and the rapidly quenching treatment in the same manner as described in Example 1 to further form a carbon-containing layer and obtain an active material according to Example 7. The obtained active material particles contained primary particles and secondary particles. A three-electrode beaker cell was prepared in the same manner as described in Example 1 except that the above active material was used.

Example 8

An active material was prepared in the same manner as described in Example 7 except that ferric oxide was added instead of potassium carbonate as a powder to be added after the pre-firing. The obtained active material particles contained primary particles and secondary particles. A three-electrode beaker cell was prepared in the same manner as described in Example 1 except that the above active material was used.

Example 9

An active material was obtained in the same manner as described in Example 1 except that titanium dioxide, niobium pentoxide, and phosphorus pentoxide were mixed at a molar ratio of 1.000:0.75:1.25, respectively, and a raw material mixed powder was prepared using a ball mill. The obtained active material particles contained primary particles and secondary particles. Thereafter, a three-electrode beaker cell was prepared in the same manner as described in Example 1 except that the above active material was used.

Example 10

An active material was obtained in the same manner as described in Example 7 except that as raw material mixed powder, titanium dioxide, niobium pentoxide, tantalum pentoxide, vanadium pentoxide, bismuth (ITT) oxide, and phosphorus pentoxide were added so that the molar ratio was 1.00:0.98:0.005:0.005:0.005:0.01. The obtained active material particles contained primary particles and secondary particles. Thereafter, a three-electrode beaker cell was prepared in the same manner as described in Example 1 except that the above active material was used.

Example 11

An active material was obtained in the same manner as described in Example 7 except that titanium dioxide, niobium pentoxide, potassium carbonate, silicon oxide and phosphorus pentoxide were mixed as raw material mixed powders so that the respective molar ratios were 0.95:0.99: 0.005:0.01:0.05. The obtained active material particles contained primary particles and secondary particles. Thereafter, a three-electrode beaker cell was prepared in the same manner as described in Example 1 except that the above active material was used.

Example 12

An active material was obtained in the same manner as described in Example 7 except that as a raw material mixed powder, titanium dioxide, niobium pentoxide, molybdenum trioxide, sodium carbonate, magnesium oxide, tungsten trioxide, and phosphorus pentoxide were mixed in a molar ratio of 0.93:0.985:0.02:0.005:0.01:0.03:0.0125. The obtained active material particles contained primary particles and secondary particles. Thereafter, a three-electrode beaker cell was prepared in the same manner as described in Example 1 except that the above active material was used.

Example 13

An active material was obtained in the same manner as described in Example 7 except that as a raw material mixed powder, titanium dioxide, niobium pentoxide, molybdenum trioxide, chromium trioxide, iron (III) oxide, aluminum oxide, boron oxide and phosphorus pentoxide were mixed in molar ratios of 0.7:0.845:0.15:0.025:0.025:0.05:0.05:0.015 was used. The obtained active material particles contained primary particles and secondary particles. Thereafter, a three-electrode beaker cell was prepared in the same manner as described in Example 1 except that the above active material was used.

Comparative Example 1

Titanium dioxide and niobium pentoxide were mixed at a molar ratio of 1:1, respectively, and a raw material mixed powder was prepared using a ball mill. Next, this mixture was heated at a firing temperature of 1200° C. for 12 hours to obtain an active material according to Comparative Example 1. The obtained active material particles contained primary particles and secondary particles. A three-electrode beaker cell was prepared in the same manner as described in Example 1 except that the above active material was used.

Comparative Example 2

An active material according to Comparative Example 2 was obtained in the same manner as described in Example 1 except that in the second main firing, the temperature was raised at a rate of 10° C./min and fired for 10 hours at a firing temperature of 1000° C., then the temperature of the electric furnace was decreased at a rate of 10° C./min and slowly cooled to room temperature. The obtained active material particles contained primary particles and secondary particles. A three-electrode beaker cell was prepared in the same manner as described in Example 1 except that the above active material was used.

Comparative Example 3

Titanium dioxide, niobium pentoxide, and phosphorus pentoxide were mixed at a molar ratio of 1:0.9:0.1, respectively, and a raw material mixed powder was prepared using a ball mill. Next, this mixture was heated at a firing temperature of 1200° C. for 12 hours to obtain an active material represented by the chemical formula $Nb_{1.8}P_{0.2}TiO_7$. Next, titanium tetraisopropoxide, niobium chloride, and phosphoric acid were mixed in ethanol at a molar ratio of 1:0.95:0.05 to prepare a sol-gel solution. The sol-gel solution was spray-coated on the surface of the active material powder represented by the chemical formula $Nb_{1.8}P_{0.2}TiO_7$ by using a tumbling fluidized device, and then fired at 800° C. for 5 hours, to form a layer represented by the chemical formula $Nb_{1.9}P_{0.1}TiO_7$. The $Nb_{1.9}P_{0.1}TiO_7$ layer obtained at this time was 30% by weight based on the $Nb_{1.8}P_{0.2}TiO_7$ particles as the core layer. This composite particle was used as an active material of Comparative Example 3. The obtained active material particles contained primary particles and secondary particles. A three-electrode beaker cell was prepared in the same manner as described in Example 1 except that the above active material was used.

Comparative Example 4

The surfaces of the particles of the active material powder obtained in Comparative Example 1 was coated with a lithium phosphate compound according to the following procedure. First, phosphoric acid was dissolved in a mixed solution of titanium tetraisopropoxide and absolute ethanol with stirring to obtain a sol-gel solution containing P and Li. The molar ratio of P and Li in this sol-gel solution was P:Li=1:3. In addition, this solution contained 30% by weight of a solid content calculated as solid content of phosphoric acid and titanium tetraisopropoxide. Using tumbling fluidized device, this sol-gel solution was coated on the particle surfaces of the core particles of Comparative Example 1 to obtain a precursor. This precursor was subjected to firing in air at 400° C. for 1 hour. Thus, an active material of Comparative Example 4 was obtained. The obtained active material particles contained primary particles and secondary particles. A three-electrode beaker cell was prepared in the same manner as described in Example 1 except that the above active material was used.

<Various Analyses>

Powder X-ray diffraction and ICP analysis were performed on the active materials obtained in Examples and Comparative Examples by the method described in the first embodiment to specify an average composition of the active materials and a phosphate compound present on the primary particles surfaces. In addition, TEM-EDX observation was performed by the method described in the first embodiment, and a concentration ratio (C2/C1) was calculated. Table 1 shows the result thereof.

<Evaluation of Battery Characteristics>

Charge/discharge characteristics of the beaker cells according to Examples and Comparative Examples were evaluated. For the charge/discharge capacity, an initial capacity (0.2 C discharge capacity) was measured when the battery was charged at a time charge rate of 0.2 C for 10 hours and discharged at a time discharge rate of 0.2 C. Also, a resistance of 1 kHz was measured after the initial charge and discharge, and this value was taken as an initial resistance value.

Next, the battery was charged at a time charge rate of 0.2 C for 10 hours, then discharged at a time discharge rate of 3 C, and a capacity at this time was divided by the initial capacity to calculate a 3 C/0.2 C discharge capacity ratio. The 3 C/0.2 C discharge capacity ratio is an index of the rate characteristics.

Further, a charge-and-discharge cycle was performed 100 times at a time charge/discharge rate of 1 C, and the discharge capacity at a charge/discharge rate of 0.2 C after 100 cycles was measured. The value of this discharge capacity divided by the value of the initial capacity and multiplied by 100 was taken as a cycle capacity retention ratio. The capacity retention ratio is an index of the life characteristics. Values each obtained by measuring a resistance of 1 kHz after 100 cycles and dividing the resistance by the initial resistance value as resistance ratios, and these values were shown in Table 1. The resistance ratio is an index of the life characteristics.

TABLE 1

| | Manufacturing method | | Active material | | | | | |
|---|---|---|---|---|---|---|---|---|
| | Synthesis method | Rapidly quenching treatment | Chemical formula | Phosphate compound at primary particle surface | Concentration C1 (atm %) | Concentration C2 (atm %) | Concentration ratio C2/C1 | Concentration gradient |
| Example 1 | 1 | Yes | $Nb_{1.999}P_{0.001}TiO_7$ | Phosphorus oxide | 0.01 | 0.0105 | 1.05 | Yes |
| Example 2 | 1 | Yes | $Nb_{1.99}P_{0.01}TiO_7$ | Phosphorus oxide | 0.10 | 0.98 | 9.80 | Yes |
| Example 3 | 1 | Yes | $Nb_{1.99}P_{0.01}TiO_7$ | Phosphorus oxide | 0.10 | 5.2 | 52.00 | Yes |
| Example 4 | 1 | Yes | $Nb_{1.999}P_{0.01}TiO_7$ | Phosphorus oxide | 0.10 | 9.98 | 99.80 | Yes |
| Example 5 | 1 | Yes | $Nb_{1.95}P_{0.05}TiO_7$ | Phosphorus oxide | 0.50 | 9.97 | 19.90 | Yes |
| Example 6 | 1 | Yes | $Nb_{1.9}P_{0.1}TiO_7$ | Phosphorus oxide | 1.00 | 5.3 | 5.30 | Yes |
| Example 7 | 2 | Yes | $Nb_{1.9}P_{0.1}TiO_7$ | Potassium phosphate | 1.00 | 5.4 | 5.40 | Yes |
| Example 8 | 2 | Yes | $Nb_{1.9}P_{0.1}TiO_7$ | Iron phosphate | 1.00 | 5.1 | 5.10 | Yes |
| Example 9 | 1 | Yes | $Nb_{1.5}P_{0.5}TiO_7$ | Phosphorus oxide | 5.10 | 15 | 3.02 | Yes |
| Example 10 | 2 | Yes | $Nb_{1.96}P_{0.01}Ta_{0.01}V_{0.01}Bi_{0.01}TiO_7$ | Potassium phosphate | 0.10 | 0.21 | 2.10 | Yes |
| Example 11 | 2 | Yes | $Nb_{1.98}K_{0.01}Ti_{0.95}P_{0.06}Si_{0.01}O_7$ | Potassium phosphate | 0.49 | 1.08 | 2.20 | Yes |
| Example 12 | 2 | Yes | $Nb_{1.97}P_{0.01}Na_{0.01}Mg_{0.01}Ti_{0.93}Mo_{0.04}W_{0.03}O_7$ | Potassium phosphate | 0.10 | 0.25 | 2.50 | Yes |
| Example 13 | 2 | Yes | $Nb_{1.69}P_{0.01}Mo_{0.3}Ti_{0.7}Cr_{0.05}Fe_{0.05}Al_{0.1}B_{0.1}O_7$ | Potassium phosphate | 0.10 | 0.29 | 2.90 | Yes |
| Comparative Example 1 | — | No | $Nb_2TiO_7$ | N/A | 0.00 | 0.00 | — | No |
| Comparative Example 2 | — | No | $Nb_{1.999}P_{0.001}TiO_7$ | Phosphorus oxide | 0.01 | 0.01 | 1.00 | No |
| Comparative Example 3 | — | No | $Nb_{1.8}P_{0.2}TiO_7/Nb_{1.9}P_{0.1}TiO_7$ | Phosphorus oxide | 2.10 | 1.05 | 0.53 | Inverse |
| Comparative Example 4 | — | No | $Nb_2TiO_7$ | Potassium phosphate | 0.00 | 0.00 | — | No |

TABLE 1-continued

|  | Battery characteristics | | | |
|---|---|---|---|---|
|  | 0.2 C discharge capacity (mAh/g) | 3 C/0.2 C discharge capacity ratio | Capacity retention ratio after 100 cycles (%) | Resistance ratio after 100 cycles |
| Example 1 | 270.5 | 0.92 | 98.5 | 1.1 |
| Example 2 | 269.2 | 0.93 | 98.4 | 1.08 |
| Example 3 | 264.3 | 0.9 | 98.5 | 1.07 |
| Example 4 | 262.1 | 0.89 | 97.3 | 1.24 |
| Example 5 | 266.5 | 0.89 | 98.4 | 1.07 |
| Example 6 | 267 | 0.91 | 98.2 | 1.09 |
| Example 7 | 267.2 | 0.9 | 99.1 | 1.03 |
| Example 8 | 267.4 | 0.92 | 98.9 | 1.04 |
| Example 9 | 261.9 | 0.87 | 97.8 | 1.15 |
| Example 10 | 264.2 | 0.93 | 99.2 | 1.02 |
| Example 11 | 265.8 | 0.93 | 99.4 | 1.03 |
| Example 12 | 265.1 | 0.94 | 99 | 1.03 |
| Example 13 | 266.7 | 0.94 | 99.2 | 1.02 |
| Comparative Example 1 | 258.1 | 0.79 | 84.3 | 1.95 |
| Comparative Example 2 | 268.9 | 0.81 | 89.7 | 1.31 |
| Comparative Example 3 | 259.7 | 0.77 | 81.2 | 2.05 |
| Comparative Example 4 | 254.4 | 0.76 | 84.4 | 1.89 |

In Table 1, the column of "Synthesis method" shows which is a corresponding synthesis method between the first and second synthesis methods described in the first embodiment. In the column of "Phosphate compound at primary particle surface", the type of the phosphate compound mainly present on the primary particle surface is shown. In the column of "Concentration gradient", "Yes" is shown for an example that includes a primary particle having a concentration gradient in which the phosphorus concentration increases from the position of the gravity point of the primary particle toward the particle surface. "No" is shown for an example that includes a primary particle having no concentration gradient. In addition, "Inverse" is shown for an example that includes a primary particle having a concentration gradient in which the phosphorus concentration decreases from the position of the gravity point of the primary particle toward the particle surface.

The following can be found from Table 1.

In each of Examples 1 to 13 including the primary particle having a concentration gradient in which the phosphorus concentration increases from the position of the gravity point of the primary particle toward the particle surface, the rate characteristics were excellent while a practical battery capacity was maintained.

Comparative Example 1 and Comparative Example 4 are monoclinic niobium-titanium composite oxides not containing phosphorus. The active material according to Comparative Example 4 further has lithium phosphate as a phosphate compound on the primary particle surface. These active materials were inferior in discharge capacity and rate characteristics to Examples 1 to 13.

Comparative Example 2 is a monoclinic niobium-titanium composite oxide containing phosphorus, but the phosphorus concentration at the position of the gravity point of primary particles is the same as the phosphorus concentration at the position corresponding to 80% of the length defined from the gravity point to the surface of the primary particle. That is, the active material according to Comparative Example 2 does not have a concentration gradient of phosphorus. The discharge capacity of the active material according to Comparative Example 2 was relatively excellent, but the rate characteristics thereof were inferior to those of Examples 1 to 13.

Comparative Example 3 contained a primary particle having a concentration gradient in which the phosphorus concentration gradually decreases from the position of the gravity point of the primary particle toward the particle surface. Similarly to Comparative Examples 1 and 4, Comparative Example 3 was inferior to Examples 1 to 13 in both capacity and rate characteristics.

In Examples 1 to 13 in which the concentration ratio C2/C1 was in the range of 1.05 to 100, the rate characteristics were excellent while the practical battery capacity was maintained, as compared with Comparative Examples 1 to 4. The reason for this is considered to be that the diffusion rate of lithium ions is high in the vicinity of the surface of the particle having a high phosphorus concentration and the relatively large amount of lithium ions can be inserted in the vicinity of the gravity point of the particle having a low phosphorus concentration.

In addition, the active material produced in each of Examples 1 to 13 contained a secondary particle formed of a plurality of primary particles, and a phosphate compound was present between these primary particles. The capacity retention ratios and resistance ratios of Examples 1 to 13 were superior to those of Comparative Examples. This is considered to be because the lithium conduction path could be maintained by suppressing the shredding of the conductive path between the primary particles even when the charge-and-discharge cycle was repeated.

As shown in Examples 7, 8 and 10 to 13, when at least a part of the surface of the primary particles was potassium phosphate or iron phosphate, the rate characteristics tended to be more excellent and the lifetime characteristics were also excellent. The reason for this is considered to be that primary particles are strongly bound by phosphate and iron and potassium contribute to enhancement of lithium ion conductivity.

According to at least one embodiment and example described above, an active material is provided. The active material includes a primary particle containing a phosphorus-containing monoclinic niobium-titanium composite oxide. The primary particle has a concentration gradient in which a phosphorus concentration increases from the gravity point of the primary particle toward the surface of the primary particle. The active material can realize a secondary battery capable of achieving excellent rate characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising
    a primary particle comprising a phosphorus-containing monoclinic niobium-titanium composite oxide,
    wherein the primary particle has a concentration gradient in which a phosphorus concentration increases from a gravity point of the primary particle toward a surface of the primary particle, and
    the phosphorus-containing monoclinic niobium-titanium composite oxide has an average composition represented by a general formula $Ti_{1-x}M1_xNb_{2-y-z}M2_yP_zO_7$, where
    $0 \leq x < 1$, $0 \leq y < 1$, $0 < z \leq 0.5$,
    each of elements M1 and M2 is at least one selected from the group consisting of V, Ta, Fe, Bi, Cr, Mo, W, B, K, Na, Mg, Al, and Si, and
    the element M1 and the element M2 may be the same element or different elements from each other.

2. The active material according to claim 1, wherein a ratio (C2/C1) of a phosphorus concentration (C2) at a position corresponding to 80% of a length defined from the gravity point to the surface of the primary particle, with respect to a phosphorus concentration (C1) at a position of the gravity point of the primary particle is in a range of 1.05 to 100.

3. The active material according to claim 1, wherein a phosphate compound is present at least a part of the surface of the primary particle.

4. The active material according to claim 3, comprising
    a secondary particle formed of a plurality of the primary particle,
    wherein the phosphate compound is present between the plurality of the primary particle.

5. The active material according to claim 3, wherein the phosphate compound comprises at least one selected from the group consisting of phosphorus oxide, iron phosphate, and potassium phosphate.

6. The active material according to claim 5, wherein the phosphate compound comprises at least one selected from the group consisting of iron phosphate and potassium phosphate.

7. An electrode comprising the active material according to claim 1.

8. The electrode according to claim 7, wherein the electrode comprises an active material-containing layer comprising the active material.

9. A secondary battery comprising:
    a positive electrode;
    a negative electrode; and
    an electrolyte,
    wherein the negative electrode is the electrode according to claim 7.

10. A battery pack comprising the secondary battery according to claim 9.

11. The battery pack according to claim 10, further comprising
    an external power distribution terminal; and
    a protective circuit.

12. The battery pack according to claim 10, comprising a plurality of the secondary battery, wherein the plurality of the secondary battery are electrically connected in series, in parallel, or in combination of in series and in parallel.

13. A vehicle comprising the battery pack according to claim 10.

14. The vehicle according to claim 13, comprising a mechanism configured to convert kinetic energy of the vehicle into regenerative energy.

* * * * *